US012365559B2

(12) United States Patent
Slovut et al.

(10) Patent No.: US 12,365,559 B2
(45) Date of Patent: *Jul. 22, 2025

(54) METHOD FOR PERFORATING A NONLINEAR LINE OF WEAKNESS

(71) Applicant: The Procter & Gamble Company, Cincinnati, OH (US)

(72) Inventors: Deborah Sue Slovut, Madeira, OH (US); Laura Marie Tanno, Cincinnati, OH (US); Kathryn Christian Kien, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,084

(22) Filed: May 23, 2024

(65) Prior Publication Data

US 2024/0391725 A1 Nov. 28, 2024

Related U.S. Application Data

(63) Continuation of application No. 18/302,860, filed on Apr. 19, 2023, now Pat. No. 12,030,739, which is a (Continued)

(51) Int. Cl.
*B65H 35/08* (2006.01)
*B26D 7/26* (2006.01)
(Continued)

(52) U.S. Cl.
CPC ............... *B65H 35/08* (2013.01); *B26D 7/26* (2013.01); *B26D 7/2628* (2013.01); *B26D 7/265* (2013.01);
(Continued)

(58) Field of Classification Search
CPC ........ B65H 35/08; B26D 7/26; B26D 7/2628; B26D 7/265; B26D 2007/2664; B26F 1/20; B26F 1/22
(Continued)

(56) References Cited

U.S. PATENT DOCUMENTS 405,412 A 6/1889 Hicks
714,652 A 11/1902 Davis
(Continued)

FOREIGN PATENT DOCUMENTS

DE 1090069 B 9/1960
DE 1112881 B 8/1961
(Continued)

OTHER PUBLICATIONS

13740 PCT Search Report and Written Opinion for PCT/US2016/020164 dated May 20, 2016, 10 pages.
(Continued)

*Primary Examiner* — Omar Flores Sanchez
(74) *Attorney, Agent, or Firm* — Richard L. Alexander; Wednesday G. Shipp

(57) ABSTRACT

A method for providing a nonlinear line of weakness on a web material including providing: a base, a support, a blade, and a driving means. The base may comprise at least one counter component having a length ($L_{CC}$) where the counter component comprises a nonlinear shape having a shape width (W) and may have a plurality of teeth. The support may be operatively engaged with the base. The blade may have a length ($L_B$) and may be disposed on the support so as to either contact or to come in close proximity with the counter component. At least one of the counter component and the blade may have a nonlinear shape.

20 Claims, 16 Drawing Sheets

Related U.S. Application Data continuation of application No. 17/849,844, filed on Jun. 27, 2022, now Pat. No. 11,661,301, which is a continuation of application No. 17/124,540, filed on Dec. 17, 2020, now Pat. No. 11,407,608, which is a continuation of application No. 15/923,058, filed on Mar. 16, 2018, now Pat. No. 10,889,459, which is a continuation of application No. 15/072,412, filed on Mar. 17, 2016, now Pat. No. 9,950,892.

(60) Provisional application No. 62/134,039, filed on Mar. 17, 2015.

(51) Int. Cl.
*B26F 1/20* (2006.01)
*B26F 1/22* (2006.01)

(52) U.S. Cl.
CPC ........ *B26F 1/20* (2013.01); *B26D 2007/2664* (2013.01); *B26F 1/22* (2013.01)

(58) Field of Classification Search
USPC .............................................................. 83/30
See application file for complete search history.

(56) References Cited

U.S. PATENT DOCUMENTS

| | | | |
|---|---|---|---|
| 1,383,868 | A | 7/1921 | Smith |
| 2,007,544 | A | 7/1935 | Meisel |
| 2,328,109 | A | 8/1943 | Thompson |
| 2,588,581 | A | 3/1952 | Sieger |
| 2,805,715 | A | 9/1957 | Abraham |
| 3,190,163 | A | 6/1965 | Bradley |
| 3,228,274 | A | 1/1966 | George |
| 3,264,921 | A | 8/1966 | Daniel |
| 3,321,145 | A | 5/1967 | Gorman |
| 3,467,250 | A | 9/1969 | Elia et al. |
| 3,583,558 | A | 6/1971 | Davis |
| 3,716,132 | A | 2/1973 | Lewyckyj |
| 3,733,949 | A | 5/1973 | Bradley |
| 3,752,304 | A | 8/1973 | Alef |
| 3,762,542 | A | 10/1973 | Grimes |
| 3,769,868 | A | 11/1973 | Hornung |
| 3,770,172 | A | 11/1973 | Nystrand et al. |
| 3,779,123 | A | 12/1973 | Chafee |
| 3,931,886 | A | 1/1976 | Yamauchi |
| 4,034,637 | A | 7/1977 | Ollery |
| 4,044,641 | A | 8/1977 | Burt, Jr. et al. |
| 4,063,493 | A | 12/1977 | Mcevers et al. |
| 4,164,329 | A | 8/1979 | Higby |
| 4,199,090 | A | 4/1980 | Reed |
| 4,210,688 | A | 7/1980 | Sato |
| 4,240,312 | A | 12/1980 | Ward, Sr. |
| 4,244,251 | A | 1/1981 | Iwao et al. |
| 4,295,843 | A | 10/1981 | Otomaru |
| 4,457,964 | A | 7/1984 | Kaminstein |
| 4,610,189 | A | 9/1986 | Lombardo |
| 4,747,364 | A | 5/1988 | Horowitz |
| 4,759,247 | A | 7/1988 | Bell et al. |
| 4,884,719 | A | 12/1989 | Levine et al. |
| 5,041,317 | A | 8/1991 | Greyvenstein |
| 5,114,771 | A | 5/1992 | Ogg et al. |
| 5,117,718 | A | 6/1992 | Wittkopf |
| 5,125,302 | A | 6/1992 | Biagiotti |
| 5,205,454 | A | 4/1993 | Schutz et al. |
| 5,246,110 | A | 9/1993 | Greyvenstein |
| 5,284,304 | A | 2/1994 | Biagiotti |
| 5,344,091 | A | 9/1994 | Molison |
| 5,445,054 | A | 8/1995 | Pryor |
| 5,453,311 | A | 9/1995 | Svensson |
| 5,562,964 | A | 10/1996 | Jones |
| 5,613,347 | A | 3/1997 | Weder |
| 5,616,387 | A | 4/1997 | Augst et al. |
| 5,704,566 | A | 1/1998 | Schutz et al. |
| 5,740,657 | A | 4/1998 | Weder |
| 5,740,658 | A | 4/1998 | Weder |
| D393,950 | S | 5/1998 | Lockhart |
| 5,755,654 | A | 5/1998 | Schulz et al. |
| 5,789,050 | A | 8/1998 | Kang |
| 5,797,305 | A | 8/1998 | Harrod et al. |
| 5,806,399 | A | 9/1998 | Oechsner |
| 5,853,117 | A | 12/1998 | Traise |
| 6,029,921 | A | 2/2000 | Johnson |
| 6,092,354 | A | 7/2000 | Takahashi |
| 6,139,186 | A | 10/2000 | Fraser |
| 6,228,454 | B1 | 5/2001 | Johnson et al. |
| 6,431,491 | B1 | 8/2002 | Biagiotti |
| 6,447,864 | B2 | 9/2002 | Johnson et al. |
| 6,460,727 | B1 | 10/2002 | Irwin |
| 6,464,120 | B1 | 10/2002 | Johnson et al. |
| 6,536,624 | B2 | 3/2003 | Johnson et al. |
| 6,565,794 | B1 | 5/2003 | Fraser |
| 6,694,535 | B1 | 2/2004 | Gianesi |
| 6,698,323 | B2 | 3/2004 | Formon et al. |
| 6,838,040 | B2 | 1/2005 | Mlinar et al. |
| 6,877,689 | B2 | 4/2005 | Butterworth |
| D589,264 | S | 3/2009 | Hanafusa |
| 7,707,661 | B2 | 5/2010 | Issachar |
| 7,971,514 | B2 | 7/2011 | Alalu |
| 7,988,607 | B2 | 8/2011 | Baggot et al. |
| 8,166,857 | B2 | 5/2012 | Powell et al. |
| 8,268,429 | B2 | 9/2012 | McNeil et al. |
| 8,277,917 | B2 | 10/2012 | Neto et al. |
| 8,283,013 | B2 | 10/2012 | Feldmann et al. |
| 8,287,976 | B2 | 10/2012 | Hupp |
| 8,287,977 | B2 | 10/2012 | Mcneil et al. |
| 8,312,797 | B2 | 11/2012 | Hsu |
| 8,353,236 | B2 | 1/2013 | De Marco et al. |
| 8,443,725 | B2 | 5/2013 | Mcneil et al. |
| 8,448,816 | B2 | 5/2013 | Gordon |
| 8,468,938 | B2 | 6/2013 | Redd |
| 8,535,483 | B2 | 9/2013 | Mellin et al. |
| 8,539,867 | B2 | 9/2013 | Powell et al. |
| 8,621,966 | B2 | 1/2014 | Germaine et al. |
| 8,757,058 | B2 | 6/2014 | Kien et al. |
| 8,763,523 | B2 | 7/2014 | Mcneil et al. |
| 8,763,526 | B2 | 7/2014 | Mcneil et al. |
| 8,802,211 | B2 | 8/2014 | Cattacin et al. |
| 9,195,861 | B2 | 11/2015 | Bigari et al. |
| 9,259,848 | B2 | 2/2016 | Hupp et al. |
| 9,409,372 | B2 | 8/2016 | Hada et al. |
| 9,486,932 | B2 | 11/2016 | Baggot et al. |
| 9,539,735 | B2 | 1/2017 | Ferguson |
| 9,592,621 | B2 | 3/2017 | Demarco et al. |
| 9,918,595 | B2 | 3/2018 | Olson et al. |
| 9,918,596 | B2 | 3/2018 | Olson et al. |
| 9,950,892 | B2 | 4/2018 | Slovut et al. |
| 10,005,197 | B2 | 6/2018 | Kien et al. |
| 10,188,242 | B2 | 1/2019 | Olson et al. |
| 10,232,524 | B2 | 3/2019 | Slovut et al. |
| 10,293,510 | B2 | 5/2019 | Slovut et al. |
| 10,524,622 | B2 | 1/2020 | Olson et al. |
| 10,814,513 | B2 | 10/2020 | Kien et al. |
| 10,857,690 | B2 | 12/2020 | Schwamberger et al. |
| 10,889,459 | B2 | 1/2021 | Slovut et al. |
| 10,919,168 | B2 | 2/2021 | Slovut et al. |
| 10,947,671 | B2 | 3/2021 | Glass et al. |
| 10,960,566 | B2 | 3/2021 | Slovut et al. |
| 11,008,709 | B2 | 5/2021 | Glass et al. |
| 11,008,710 | B2 | 5/2021 | Glass et al. |
| 11,407,608 | B2 | 8/2022 | Slovut et al. |
| 11,413,779 | B2 | 8/2022 | Slovut et al. |
| 11,584,034 | B2 | 2/2023 | Slovut et al. |
| 11,661,301 | B2 | 5/2023 | Slovut et al. |
| 12,030,739 | B2 | 7/2024 | Slovut |
| 2001/0000737 | A1 | 5/2001 | Johnson et al. |
| 2002/0155246 | A1 | 10/2002 | Johnson et al. |
| 2003/0000357 | A1 | 1/2003 | Tanaka |
| 2003/0033914 | A1 | 2/2003 | Mutchnik et al. |
| 2003/0132549 | A1 | 7/2003 | Mlinar et al. |
| 2003/0172785 | A1 | 9/2003 | Formon et al. |
| 2003/0218040 | A1 | 11/2003 | Faulks et al. |
| 2003/0226431 | A1 | 12/2003 | Motard |

(56) References Cited

U.S. PATENT DOCUMENTS

| | | | |
|---|---|---|---|
| 2004/0003699 | A1 | 1/2004 | Welch |
| 2004/0064911 | A1 | 4/2004 | Klupfel et al. |
| 2004/0159693 | A1 | 8/2004 | Adachi |
| 2004/0182213 | A1 | 9/2004 | Kimberly-Clark |
| 2004/0188556 | A1 | 9/2004 | Jong |
| 2004/0244556 | A1 | 12/2004 | Neal |
| 2005/0100715 | A1 | 5/2005 | Bredahl et al. |
| 2005/0115372 | A1 | 6/2005 | Cavlin |
| 2005/0155478 | A1 | 7/2005 | Zimmer |
| 2006/0011030 | A1 | 1/2006 | Wagner et al. |
| 2007/0000364 | A1 | 1/2007 | Powell et al. |
| 2007/0014961 | A1 | 1/2007 | Schneider et al. |
| 2007/0023135 | A1 | 2/2007 | Giacometti |
| 2007/0044613 | A1 | 3/2007 | Cohn |
| 2007/0209099 | A1 | 9/2007 | Issachar |
| 2008/0028902 | A1 | 2/2008 | Baggot et al. |
| 2008/0280088 | A1 | 11/2008 | Baum |
| 2009/0212153 | A1 | 8/2009 | Alalu |
| 2009/0235800 | A1 | 9/2009 | Germaine et al. |
| 2010/0112264 | A1 | 5/2010 | Barredo |
| 2010/0167896 | A1 | 7/2010 | Hada et al. |
| 2010/0199822 | A1 | 8/2010 | De et al. |
| 2010/0242698 | A1 | 9/2010 | Hsu |
| 2010/0243780 | A1 | 9/2010 | Neto |
| 2010/0264159 | A1 | 10/2010 | Gordon |
| 2010/0309544 | A1 | 12/2010 | Nomura et al. |
| 2011/0192263 | A1 | 8/2011 | De et al. |
| 2011/0290920 | A1 | 12/2011 | Kim et al. |
| 2011/0308363 | A1 | 12/2011 | Kien et al. |
| 2011/0308366 | A1 | 12/2011 | Redd |
| 2011/0308370 | A1 | 12/2011 | Hupp et al. |
| 2011/0308372 | A1 | 12/2011 | Mcneil et al. |
| 2011/0308405 | A1 | 12/2011 | Mcneil et al. |
| 2011/0308406 | A1 | 12/2011 | Mcneil et al. |
| 2011/0308754 | A1 | 12/2011 | Mcneil et al. |
| 2011/0311748 | A1 | 12/2011 | Hupp |
| 2011/0311749 | A1 | 12/2011 | Mcneil et al. |
| 2011/0311750 | A1 | 12/2011 | Mcneil et al. |
| 2011/0311751 | A1 | 12/2011 | Feldmann et al. |
| 2012/0111166 | A1 | 5/2012 | Yamada et al. |
| 2012/0174720 | A1 | 7/2012 | Powell et al. |
| 2012/0198979 | A1 | 8/2012 | Ohsawa |
| 2012/0216663 | A1 | 8/2012 | Carmichael |
| 2012/0234145 | A1 | 9/2012 | Kandemir |
| 2012/0234152 | A1 | 9/2012 | Carmichael |
| 2012/0245011 | A1 | 9/2012 | De Matteis |
| 2013/0036884 | A1 | 2/2013 | Schurch et al. |
| 2013/0049438 | A1 | 2/2013 | Nootbaar et al. |
| 2013/0294808 | A1 | 11/2013 | Douillard et al. |
| 2014/0174270 | A1 | 6/2014 | Demarco et al. |
| 2014/0238210 | A1 | 8/2014 | Baggot et al. |
| 2014/0344702 | A1 | 11/2014 | Edge et al. |
| 2014/0346704 | A1 | 11/2014 | Sartini et al. |
| 2014/0366695 | A1 | 12/2014 | Kien et al. |
| 2014/0366702 | A1 | 12/2014 | Kien et al. |
| 2014/0370224 | A1 | 12/2014 | Kien et al. |
| 2015/0135925 | A1 | 5/2015 | Abrahams |
| 2015/0298340 | A1 | 10/2015 | Baggot et al. |
| 2016/0121501 | A1 | 5/2016 | Baggot et al. |
| 2016/0144525 | A1 | 5/2016 | Kenmotsu et al. |
| 2016/0271820 | A1 | 9/2016 | Slovut et al. |
| 2016/0271823 | A1 | 9/2016 | Slovut et al. |
| 2016/0271824 | A1 | 9/2016 | Slovut et al. |
| 2016/0345761 | A1 | 12/2016 | Olson et al. |
| 2016/0345786 | A1 | 12/2016 | Olson et al. |
| 2017/0280946 | A1 | 10/2017 | Weisang et al. |
| 2018/0132674 | A1 | 5/2018 | Olson et al. |
| 2018/0199766 | A1 | 7/2018 | Olson et al. |
| 2018/0201464 | A1 | 7/2018 | Slovut et al. |
| 2018/0264676 | A1 | 9/2018 | Kien et al. |
| 2018/0361606 | A1 | 12/2018 | Banowetz et al. |
| 2019/0077038 | A1 | 3/2019 | Glass et al. |
| 2019/0077039 | A1 | 3/2019 | Glass et al. |
| 2019/0078263 | A1 | 3/2019 | Glass et al. |
| 2019/0078264 | A1 | 3/2019 | Glass et al. |
| 2019/0078265 | A1 | 3/2019 | Glass et al. |
| 2019/0078266 | A1 | 3/2019 | Glass et al. |
| 2019/0078267 | A1 | 3/2019 | Glass et al. |
| 2019/0125139 | A1 | 5/2019 | Olson et al. |
| 2019/0152081 | A1 | 5/2019 | Slovut et al. |
| 2019/0232517 | A1 | 8/2019 | Slovut et al. |
| 2020/0078976 | A1 | 3/2020 | Schwamberger et al. |
| 2020/0085246 | A1 | 3/2020 | Olson et al. |
| 2020/0094998 | A1 | 3/2020 | Horz |
| 2020/0214511 | A1 | 7/2020 | Olson et al. |
| 2020/0290792 | A1 | 9/2020 | Yasui |
| 2021/0060809 | A1 | 3/2021 | Schwamberger et al. |
| 2021/0101772 | A1 | 4/2021 | Slovut et al. |
| 2021/0146566 | A1 | 5/2021 | Slovut et al. |
| 2021/0180258 | A1 | 6/2021 | Glass et al. |
| 2021/0187776 | A1 | 6/2021 | Slovut et al. |
| 2021/0197415 | A1 | 7/2021 | Kien et al. |
| 2021/0317613 | A1 | 10/2021 | Glass et al. |
| 2022/0332533 | A1 | 10/2022 | Slovut et al. |
| 2023/0257228 | A1 | 8/2023 | Slovut et al. |

FOREIGN PATENT DOCUMENTS

| | | | |
|---|---|---|---|
| DE | 1291188 | B | 3/1969 |
| DE | 2706234 | A1 | 8/1978 |
| DE | 10356037 | A1 | 7/2005 |
| DE | 202005017013 | U1 | 1/2006 |
| DE | 102005041180 | A1 | 3/2007 |
| DE | 102007062936 | A1 | 7/2009 |
| EP | 1010503 | A2 | 6/2000 |
| FR | 2161144 | A5 | 7/1973 |
| FR | 2377471 | A1 | 8/1978 |
| GB | 808244 | A | 1/1959 |
| GB | 923029 | A | 4/1963 |
| GB | 2488782 | A | 9/2012 |
| JP | H0884685 | A | 4/1996 |
| JP | 2005153997 | A | 6/2005 |
| JP | 2005296588 | A | 10/2005 |
| JP | 2007117366 | A | 5/2007 |
| WO | 9002639 | A1 | 3/1990 |
| WO | 9723398 | A1 | 7/1997 |
| WO | 9825738 | A1 | 6/1998 |
| WO | 02100614 | A1 | 12/2002 |

OTHER PUBLICATIONS

All Office Actions; U.S. Appl. No. 15/072,395, filed on Mar. 17, 2016.
All Office Actions; U.S. Appl. No. 15/072,412 filed on Mar. 17, 2016.
All Office Actions; U.S. Appl. No. 15/072,429 filed on Mar. 17, 2016.
All Office Actions; U.S. Appl. No. 15/923,058, filed on Mar. 16, 2018.
All Office Actions; U.S. Appl. No. 16/260,533 filed on Jan. 29, 2019.
All Office Actions; U.S. Appl. No. 16/382,528 filed on Apr. 12, 2019.
All Office Actions; U.S. Appl. No. 17/124,540 filed on Dec. 17, 2020.
All Office Actions; U.S. Appl. No. 17/195,852 filed on Mar. 9, 2021.
All Office Actions; U.S. Appl. No. 17/849,844, filed on Jun. 27, 2022.
All Office Actions; U.S. Appl. No. 17/156,744 filed on Jan. 25, 2021.
All Office Actions; U.S. Appl. No. 18/302,860, filed on Apr. 19, 2023.

METHOD FOR PERFORATING A NONLINEAR LINE OF WEAKNESS

CROSS REFERENCE TO RELATED APPLICATIONS

This application is a continuation of, and claims priority under 35 U.S.C. § 120 to, U.S. patent application Ser. No. 18/302,860, filed on Apr. 19, 2023, which is a continuation of U.S. patent application Ser. No. 17/849,844, filed on Jun. 27, 2022, now U.S. Pat. No. 11,661,301, granted May 30, 2023, which is a continuation of U.S. patent application Ser. No. 17/124,540, filed on Dec. 17, 2020, now U.S. Pat. No. 11,407,608, granted Aug. 9, 2022, which is a continuation of U.S. patent application Ser. No. 15/923,058, filed on Mar. 16, 2018, now U.S. Pat. No. 10,889,459, granted Jan. 12, 2021, which is a continuation of U.S. patent application Ser. No. 15/072,412, filed on Mar. 17, 2016, now U.S. Pat. No. 9,950,892, granted Apr. 24, 2018, which claims the benefit, under 35 USC § 119(e), of U.S. Provisional Patent Application Ser. No. 62/134,039, filed on Mar. 17, 2015, the entire disclosures of which are fully incorporated by reference herein.

FIELD OF THE INVENTION

The present disclosure relates to lines of weakness for web materials, and more specifically, relates to a method for producing a nonlinear line of weakness on a web material.

BACKGROUND OF THE INVENTION

Many articles and packages include or can include a line of weakness having one or more perforations to facilitate tearing the article or package. These perforations are typically provided in a straight line because providing nonlinear lines of weakness is costly and technically complex.

One particular problem relating to providing nonlinear lines of perforation is that of equipment wear. Perforating typically involves a perforating blade interacting with a counterpart such as another blade, an anvil, or a male or female counterpart. In addition, either the perforating blade or its counterpart has a plurality of teeth, thereby causing a line of perforations to be imparted on a web moving between the perforating blade and its counterpart. This consistent interaction between the perforating blade and its counterpart causes both components to wear over time. Because of the teeth, wear of the components will be uneven. For example, the non-toothed component will experience grooves where it interacts with the teeth. This localized wear necessitates replacing or repairing a component while it still has unworn, functional sections.

With shaped lines of perforations, uneven wear is more challenging. For example, one section of a straight perforating blade may consistently hit the apex of a shaped anvil, another section may consistently hit the side of the shape at a particular angle, while yet another section may not be aligned with the anvil at all because of the shape. In such example, the section of the blade interacting with the apex will wear much faster than the section that sees no interaction with the anvil, and will wear at a different rate that the section hitting the anvil's side. If the blade in this example comprised teeth, the teeth would experience different wear patterns due to their interactions with different sections of the shape. Likewise, sections of the shaped anvil would experience different wear patterns due to their interactions with different sections of the blade (i.e., the sections having teeth versus recessed areas between the teeth). Indeed, the varying angles of interaction may cause both the toothed component and the non-toothed component to experience uneven wear. The issue is even more pronounced when a blade and counterpart are not parallel, such as when a shape is helixed about a rotating roll causing even greater variation in the angles of interaction. Likewise, the problem is exasperated where the nonlinear shape also comprises a three-dimensional, shaped cross-section such as a triangle, trapezoid, etc., which also creates variation in the angles of interaction between the blade and its counterpart. As noted above, the resulting localized wear requires premature, piecemeal repair or replacement or complete replacement of components.

Separately, manufacturers often have multiple product lines and may desire to create differently shaped lines of weakness, or different perforation patterns, on those different products. Doing so often requires equipment or component changes, new equipment and/or separate machines. This can lead to higher costs and production delays.

Accordingly, there is a continuing unmet need to provide an improved perforating apparatus and method to manufacture a web with a shaped lined of weakness. In particular, there continues to be an unfulfilled need to provide an apparatus and method that minimizes uneven blade and/or counter component wear and reduces the need for equipment repairs and replacement. In addition, there is a need for an apparatus having greater flexibility and the ability to provide different patterns of perforations with little to no equipment modifications.

BRIEF DESCRIPTION OF THE DRAWINGS

The above-mentioned and other features and advantages of this disclosure, and the manner of attaining them, will become more apparent and the disclosure itself will be better understood by reference to the following description of nonlimiting embodiments of the disclosure taken in conjunction with the accompanying drawings, wherein.

DETAILED DESCRIPTION OF THE INVENTION

Figure 1:
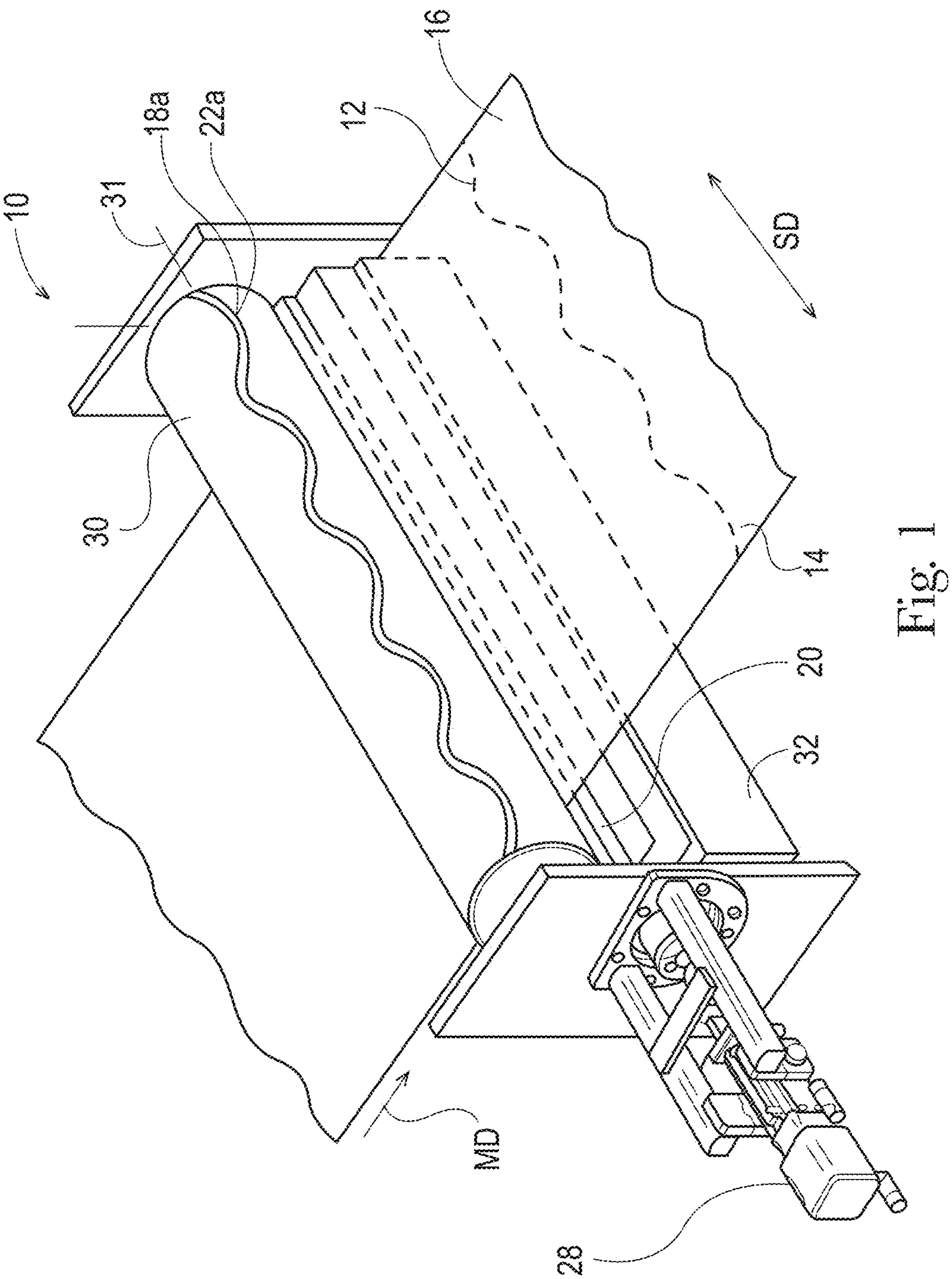
FIG. 1 is a perspective view of a perforating apparatus in accordance with an embodiment of the present disclosure.

"Fibrous structure" as used herein means a structure that comprises one or more fibrous elements. In one example, a fibrous structure according to the present disclosure means an association of fibrous elements that together form a structure capable of performing a function. A nonlimiting example of a fibrous structure of the present disclosure is an absorbent paper product, which can be a sanitary tissue product such as a paper towel, bath tissue, facial tissue or other absorbent paper product.

Nonlimiting examples of processes for making fibrous structures include known wet-laid papermaking processes, air-laid papermaking processes, and wet, solution, and dry filament spinning processes, for example meltblowing and spunbonding spinning processes, that are typically referred to as nonwoven processes. Such processes can comprise the steps of preparing a fiber composition in the form of a suspension in a medium, either wet, more specifically aqueous medium, or dry, more specifically gaseous, i.e. with air as medium. The aqueous medium used for wet-laid processes is oftentimes referred to as fiber slurry. The fibrous suspension is then used to deposit a plurality of fibers onto a forming wire or belt such that an embryonic fibrous structure is formed, after which drying and/or bonding the fibers together results in a fibrous structure. Further processing the fibrous structure can be carried out such that a finished fibrous structure is formed. For example, in typical papermaking processes, the finished fibrous structure is the fibrous structure that is wound on the reel at the end of papermaking and can subsequently be converted into a finished product (e.g., a sanitary tissue product). In one nonlimiting example, the fibrous structure is a through-air-dried fibrous structure.

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

"Sanitary tissue product" as used herein means one or more finished fibrous structures, that is useful as a wiping implement for post-urinary and post-bowel movement cleaning (e.g., toilet tissue, also referred to as bath tissue, and wet wipes), for otorhinolaryngological discharges (e.g., facial tissue), and multi-functional absorbent and cleaning and drying uses (e.g., paper towels, shop towels). The sanitary tissue products can be embossed or not embossed and creped or uncreped. The sanitary tissue product can be convolutely wound upon itself about a core or without a core to form a sanitary tissue product roll or can be in the form of discrete sheets.

"Machine Direction," MD, as used herein is the direction of manufacture for a perforated web. The machine direction can be the direction in which a web is fed through a perforating apparatus that can comprise a rotating cylinder and support, as discussed below in one embodiment. The machine direction can be the direction in which web travels as it passes through a blade and a counter component of a perforating apparatus.

"Cross Machine Direction," CD, as used herein is the direction substantially perpendicular to the machine direction. The cross machine direction can be the direction substantially perpendicular to the direction in which web travels as it passes through a blade and a counter component.

"Interacting relationship" as used herein means that two or more components are positioned such that they may cooperate to perforate a web. In one nonlimiting example, said components are placed into contacting relationship. In another nonlimiting example, said components are positioned in close proximity such that the web perforated without actual contact between the components (e.g., the web may be essentially pinched between them).

"Shifted" or "reciprocally shifting" as used herein means a substantially lateral, linear, translational movement in a first direction followed by travel back in the opposite direction. A component may be shifted in a regular manner (e.g., oscillation) or in an irregular manner (e.g., changes in velocity during the shifting stroke).

Figure 2:
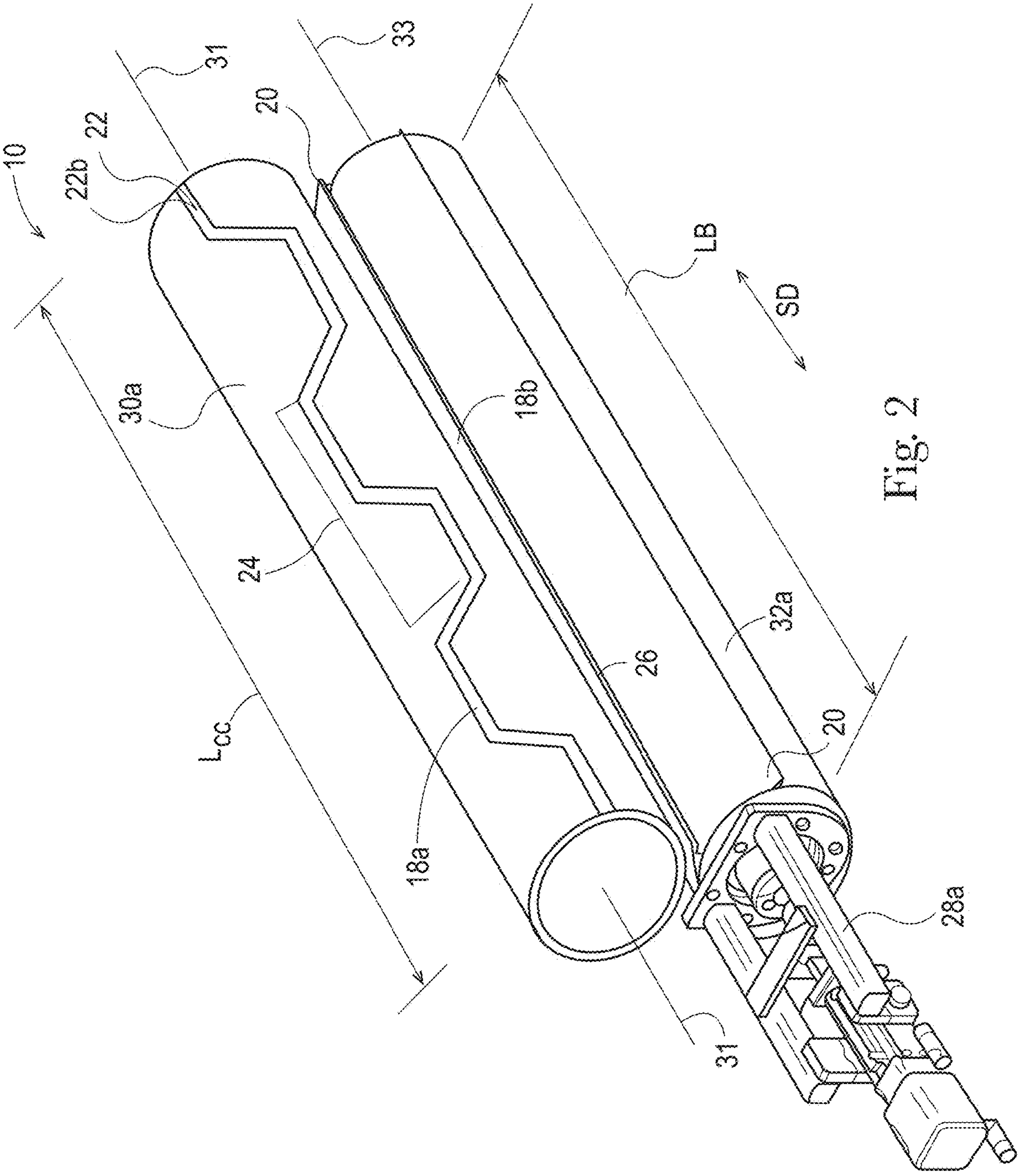
FIG. 2 is a perspective view of a perforating apparatus in accordance with another embodiment of the present disclosure.

Referring to FIGS. 1 and 2, a perforating apparatus 10 is shown for forming a shaped line of weakness 12 comprising one or more perforations 14 on a web 16. The perforating apparatus 10 may comprise two interacting components 18: a blade 20 and a counter component 22 which can be positioned into interacting relationship with the blade 20. A web 16 may be fed in a machine direction, MD, between the blade 20 and counter component 22 such that the blade 20 cooperates with the counter component 22 to perforate the web 16. One of the components 18*a* can comprise a nonlinear shape 24, which may be repeated on the shaped component 18*a*. The other, remaining component 18*b* can comprise a plurality of teeth 26. The shaped component 18*a* may rotate. At least one of the components 18 may be associated with a driving means 28, which provides that component 18 with a reciprocal shifting motion. The reciprocal shifting may cover a distance corresponding to at least the full width of the nonlinear shape 24 which is disposed on the shaped component 18*a*. By way of nonlimiting example, the two interacting components 18 may comprise a blade 20 having a plurality of teeth 26 and an anvil 22*a* comprising a nonlinear shape 24. The blade 20 and the anvil 22*a* may cooperate to perforate the web 16 in such a way to create a nonlinear line of weakness 12. The blade 20 may be associated with a driving means 28 causing the blade 20 to reciprocally shift for a distance, D, that corresponds to the width of the shape, W.

The apparatus 10 may be configured in any way suitable to achieve a shaped line of weakness 12. In one nonlimiting example, the apparatus 10 may comprise components 18 being configured as and/or having any of the features disclosed in commonly assigned U.S. patent application Ser. No. 14/301,392 which is incorporated by reference herein.

As shown in FIGS. 1 and 2, the counter components 22 may comprise an anvil 22*a* or a counterblade 22*b*. The counter component 22 may disposed on a base 30. By "disposed" is meant that the counter component 22 can be attached, integral with, removeably attached, clamped, bolted, or otherwise joined to or held by the base 30 in a stable operative position. The base 30 may comprise any shape and size suitable to hold a counter component 22. In one nonlimiting example, the base 30 is a cylinder 30*a* as shown in FIGS. 1 and 2. The cylindrical base 30*a* may be rotated about its longitudinal axis 31 when the apparatus 10 is in operation and thus cause the counter component 22 to rotate. The counter component 22 may be made to rotate such that is rotated into interacting relationship with the blade 20. In an alternative embodiment, the counter component 22 and/or the base 30 does not rotate. The base 30 can be placed in a non-rotatable position during the perforation operation. In a further embodiment, the base 30 may be turned or otherwise repositioned while the apparatus 10 is not in operation and then fixed in a position so that a different counter component 22 can be placed in interacting relationship with the blade 20 or the same counter component 22 can be placed in interacting relationship with a different blade 20.

The base 30 may comprise one or more counter components 22. In one nonlimiting example, the base 30 comprise more than 2 about counter components 22, or more than about 4 counter components 22, or between about 3 and about 9 counter components 22, or about 7 counter components 22. In one nonlimiting example, the counter components 22 are disposed in rows on the base 30. In an embodiment, at least two counter components 22 disposed on the base 30 are different. In one nonlimiting example shown in FIG. 3, a first counter component 222 comprises a first design 224. The first design 224 may comprise a first nonlinear shape 225. A second counter component 226 disposed on the base 30 may comprise a second design 228. The second design 228 may comprise a straight line and/or a second nonlinear shape 229. The first design 224 may be the same or may be different from the second design 228. Nonlimiting examples of potential differences in designs 224, 228 include variations in shape, arrangement of design elements, size and/or spacing or stretching of the design. Each counter component 22 may comprise one or more counter component segments.

Figure 3:
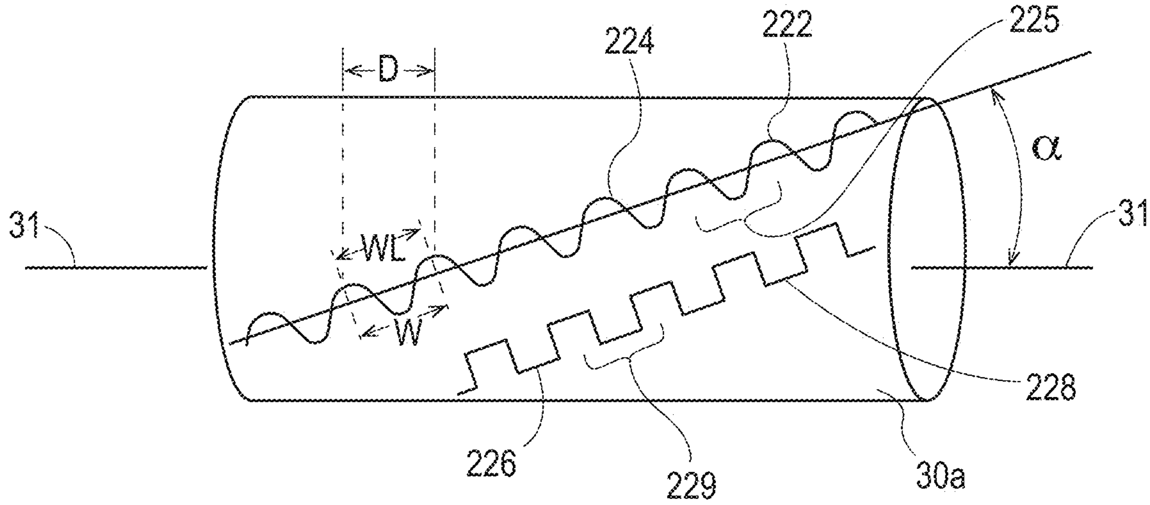
FIG. 3 is a schematic representation of a base and counter components in accordance with one embodiment of the present disclosure.

In yet another embodiment, at least one of the counter components 22 may be disposed at an angle with respect to the base 30 as shown in FIG. 3. For example, the counter component 22 may be disposed at an angle with respect to the longitudinal axis 31 of the cylindrical base 30*a*. In another nonlimiting example, the counter component 22 is helixed about the cylindrical base 30*a*. The counter component 22 can be at an angle $\alpha$ to the longitudinal cylinder axis 31 of from greater than 0 degrees to about 45 degrees and/or from about 2 degrees to about 20 degrees and/or from about 4 degrees to about 8 degrees. When used with a blade 20 positioned substantially parallel to cylinder axis 31, the helically mounted counter component 22 can reduce the number of simultaneous interaction points at a given period in time between the counter component 22 and the blade 20. Moreover, the angle $\alpha$ may be used in conjunction with nonlinear shape 24 to customize the counter component 22. For example, by manipulating $\alpha$ and the shape width, W, one could arrive a perfectly repeating shape 24 helixed about the cylinder 30*a* (i.e., the shape 24 is not cut off on the edges).

Returning to FIG. 2, the counter component 22 may comprise a length, $L_{CC}$, which is the counter component's 22 longest dimension. The blade may comprise a length, $L_B$, which is the blade's 20 longest dimension. In an embodiment, the blade length, $L_B$, is greater than the counter component length, $L_{CC}$. In such embodiment, the blade 20 may be sufficiently long such that the blade 20 can be placed into interacting relationship with the counter component 22 at any point during the shifting. This arrangement may prevent the ends of the counter component 22 from wearing at a slower rate than the remaining sections of the counter component 22. Such uneven wear could lead to perforation quality issues. In another embodiment, the blade length, $L_B$, is less than the counter component length, $L_{CC}$. In such embodiment, the counter component 22 may be sufficiently long such that the counter component 22 can be placed into interacting relationship with the blade 20 at any point during the shifting. This arrangement may prevent the ends of the blade 20 from wearing at a slower rate than the remaining sections of the blade 20. Again, such uneven wear could lead to perforation quality issues. In one nonlimiting example, the blade length, $L_B$, exceeds the counter component length, $L_{CC}$, by at least about 7% (i.e., $L_B>1.07*L_{CC}$), or by from about 8% to about 25%, or by from about 10% to about 20%. In another nonlimiting example, the counter component length, $L_{CC}$, exceeds the blade length, $L_B$, by at least about 7% (i.e., $L_{CC}>1.07*L_B$), or by from about 8% to about 25%, or by from about 10% to about 20%. The relative lengths of the components 18 may be selected based on the machine constraints, costs, tendency for wear, the length of the shifting stroke and like considerations.

Figure 4:
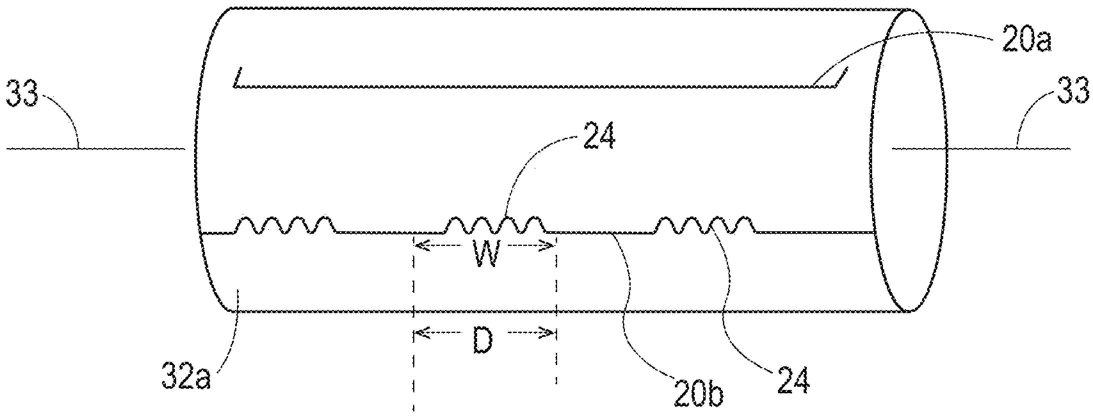
FIG. 4 is a schematic representation of a support and blades in accordance with an embodiment of the present disclosure.

The blade 20 may be disposed on a support 32. By "disposed" is meant the blade can be integral with, attached, removeably attached, clamped, bolted, or otherwise joined to or held by the support 32 in a stable operative position. In an embodiment, the blade 20 and/or the support 32 is moveable with respect to the counter component 22 and/or the base 30. In a further embodiment, the counter component 22 and/or base 30 is moveable with respect to the blade 20 and/or support 32. The support 32 may comprise any shape or size that would adequately support a blade 20. In one nonlimiting example, the support 32 can be placed in a non-rotatable position during interacting relationship with the counter component 22, independent of the shape of the support 32. The support 32 may comprise a cylinder 32*a*, as shown in FIGS. 2 and 4. The cylinder 32*a* may or may not be rotatable about its longitudinal axis 33. In another nonlimiting example, the support 32 rotates while the apparatus 10 is in operation such that the blade 20 is rotated into interacting relationship with the counter component 22. In one nonlimiting example illustrated in FIG. 4A, the blade 20 may be disposed at an angle $\gamma$ with respect to the support 32. For example, the blade 20 may be disposed at an angle with respect to the longitudinal axis 33 of the cylindrical support

32*a*. In another nonlimiting example, the blade 20 is helixed about the cylindrical support 32*a*. The blade 20 can be at an angle $\gamma$ to the support longitudinal axis 33 of from greater than 0 degrees to about 45 degrees and/or from about 2 degrees to about 20 degrees and/or from about 4 degrees to about 8 degrees. When used with a counter component 22 positioned substantially parallel to support longitudinal axis 33, the helically mounted blade 20 can reduce the number of simultaneous interaction points at a given period in time between the counter component 22 and the blade 20. Moreover, the angle $\gamma$ may be used in conjunction with nonlinear shape 24 to customize the blade 20. For example, by manipulating $\gamma$ and the shape width, W, one could arrive a perfectly repeating shape 24 helixed about the cylinder 32*a* (i.e., the shape 24 is not cut off on the edges).

In another embodiment, the counter component 22 and/or the base 30 is moveable with respect to the blade 20 and/or support 32. In a further embodiment, the support 32 may be turned or otherwise repositioned while the apparatus 10 is not in operation and then fixed in a position so that a different blade 20 can be placed in interacting relationship with the counter component 22 or the same blade 20 can be placed in interacting relationship with a different counter component 22.

Figure 4A:
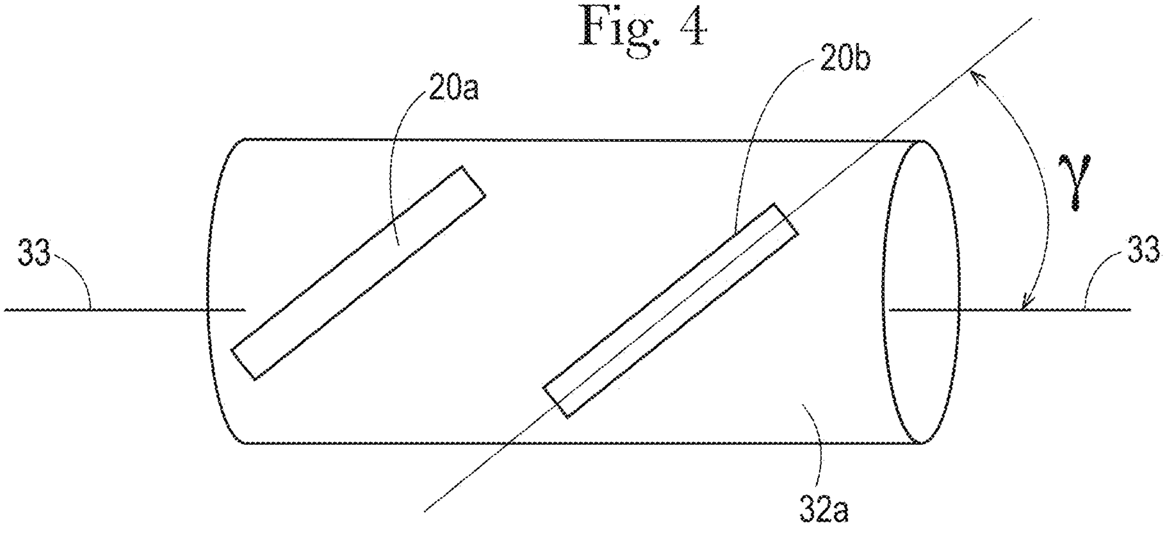
FIG. 4A is a schematic representation of a support and blades in accordance with another embodiment of the present disclosure.

One or more blades 20 can be disposed on the support 32, as shown for example in FIGS. 4 and 4A. For example, the support 32 may comprise 2 or more blades 20, or from about 2 to about 10 blades, or about 6 blades or about 4 blades. In one nonlimiting example, the blades 20 are disposed in rows on the support 32. In an embodiment, two blades 20*a*, 20*b* disposed on the support 32 can comprise different shapes as shown in FIG. 4. Each blade 20 may comprise one or more blade segments.

Figure 5A:
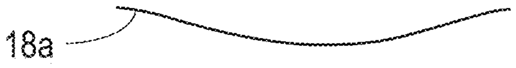
FIGS. 5A-5Q are schematic representations of profiles of a shaped component in accordance with nonlimiting examples of the present disclosure.
Figure 5B:
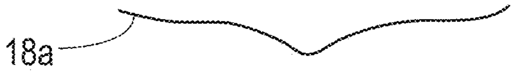
Figure 5C:
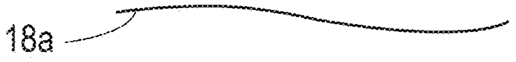
Figure 5D:
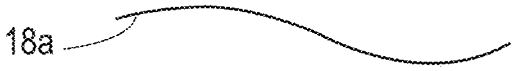
Figure 5E:
Figure 5F:
Figure 5G:
Figure 5H:
Figure 5I:
Figure 5J:
Figure 5K:
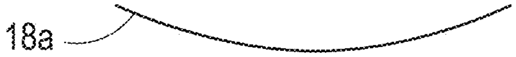
Figure 5L:
Figure 5M:
Figure 5N:
Figure 5O:
Figure 5P:
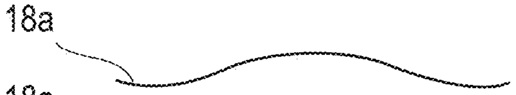
Figure 5Q:

The counter component 22 and/or the blade 20 may comprise a nonlinear shape 24 (also referred to as a curvilinear shape). In other words, the shaped component 18*a* may comprise the blade 20, or the shaped component 18*a* may comprise the counter component 22. Nonlimiting examples of possible profiles or designs that the shaped component 18*a* may comprise are illustrated in FIGS. 5A-Q. For example, the counter component 22 and/or the blade 20 may comprise a sinusoidal shape or saw-tooth shape. The profile of the shaped component 18*a* may correspond to the nonlinear line of weakness 12 imparted on the web 16 and may comprise one or more nonlinear shapes 24. The profiles depicted in FIGS. 5A-Q can be described as exhibiting a sinusoidal shape, as being a group of two or more linear elements each connecting at a single inflection point with an adjacent linear element (considered as a whole to be a nonlinear shape 24), or a combination of curvilinear and linear elements.

Figure 6:
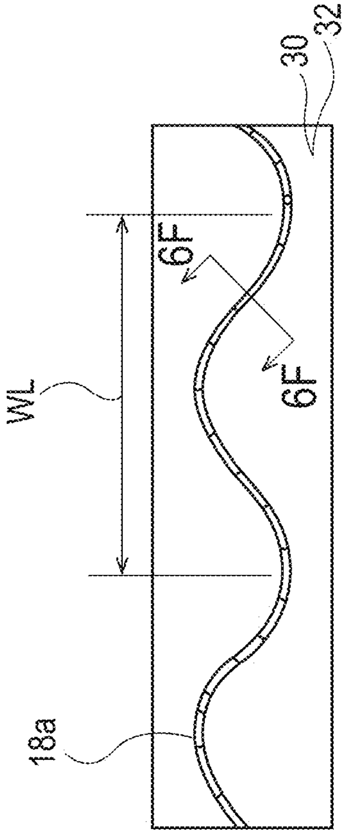
FIG. 6 is a front elevation view of a shaped component in accordance with one embodiment of the present disclosure.
Figure 6A:
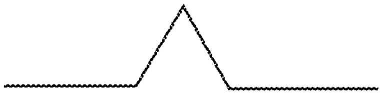
FIGS. 6A-F are cross sectional views of Section 6A-6F of FIG. 6 in accordance with nonlimiting examples of the present disclosure.
Figure 6B:
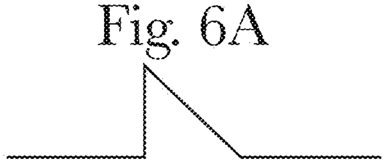
Figure 6C:
Figure 6D:
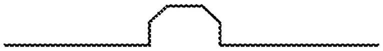
Figure 6E:
Figure 6F:

The shaped component 18*a* may comprise a shaped cross section as illustrated in FIGS. 6-6F. In one embodiment, the shaped component 18*a* can have a substantially square or rectangular cross section. In another nonlimiting example, the shaped component 18*a* can have a substantially flat top. Similarly, the counter component 22 and/or the blade 20 can have a substantially concave or convex cross section. Still in another embodiment, the counter component 22 and/or the blade 20 can have a substantially triangular cross section. Other cross sections that would allow for the components 18 to be in interacting relationship may be utilized.

Figure 7:
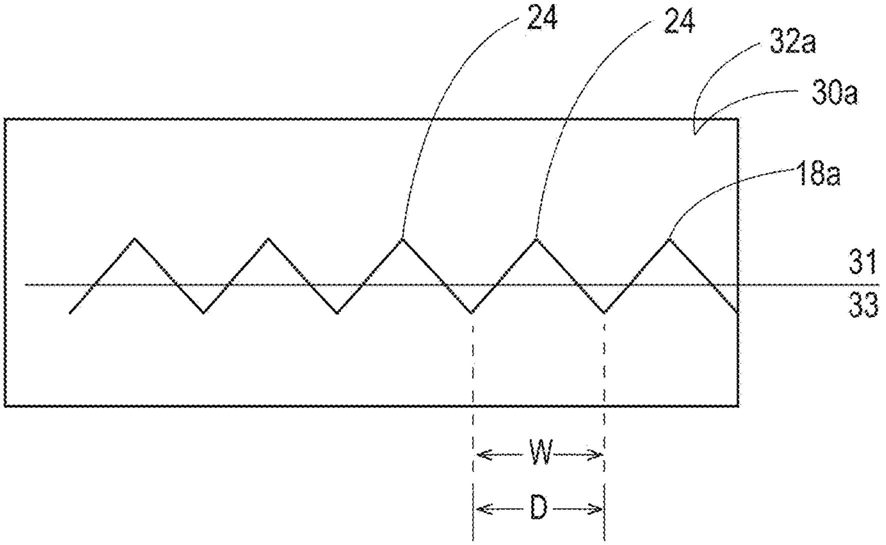
FIG. 7 is a schematic representation of a shaped component in accordance with one embodiment of the present disclosure.
Figure 7A:
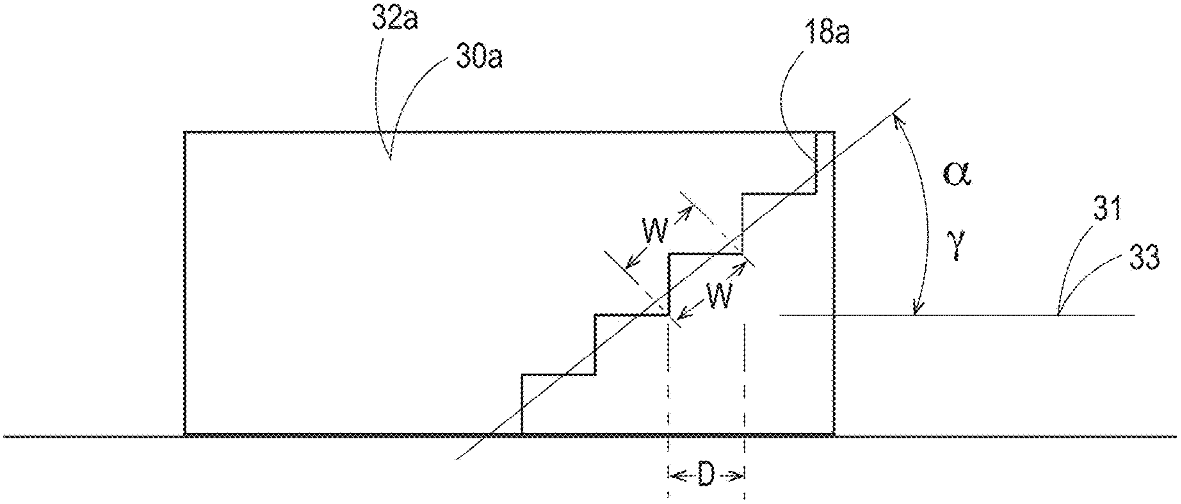
FIG. 7A is a schematic representation of a shaped component in accordance with another embodiment of the present disclosure.
Figure 8:
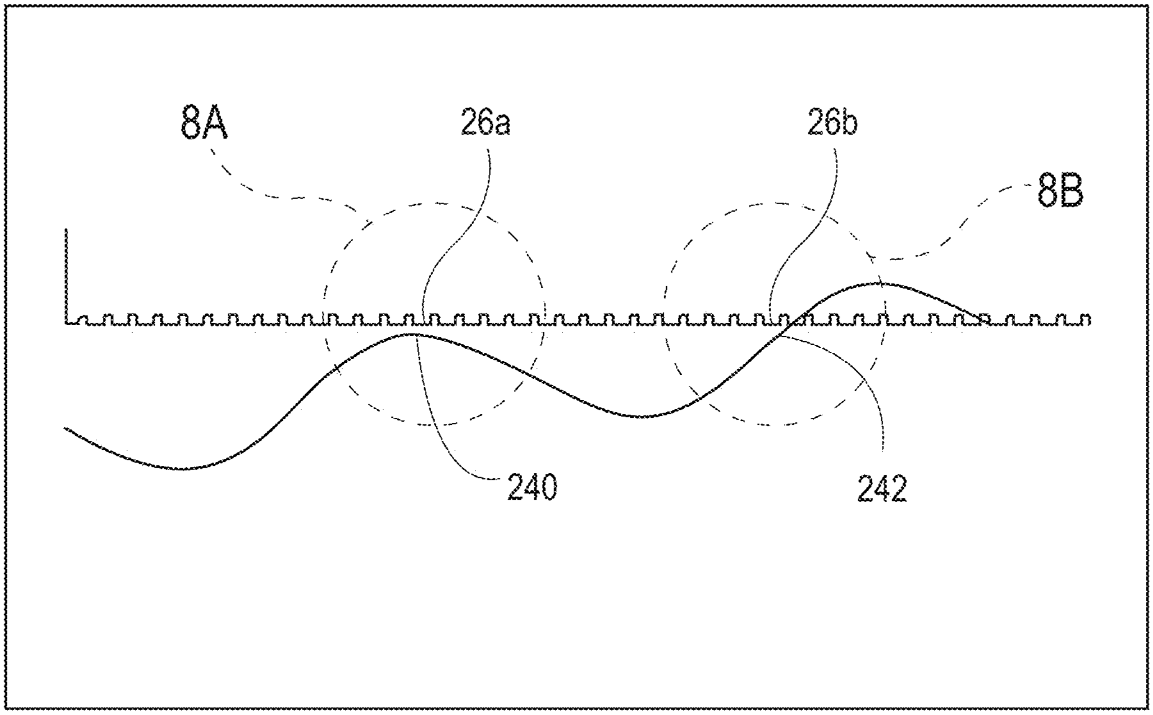
FIG. 8 is a schematic representation showing the interaction between teeth and a shaped component in accordance with an embodiment of the present disclosure.
Figure 8A:
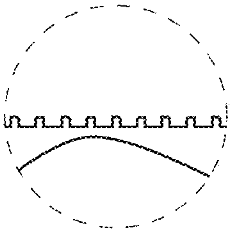
FIG. 8A is a schematic representation showing the interaction between a tooth and the shaped component of Section 8A of FIG. 8.
Figure 8B:
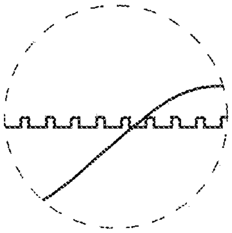
FIG. 8B is a schematic representation showing the interaction between a tooth and the shaped component of Section 8B of FIG. 8.

The non-linear shape 24 can comprise a shape width, W shown for example in FIGS. 7 and 7A. The shape width, W, is the distance along the shape 24 that two teeth 26 would need to move in order to each experience the substantially the same amount of work during a perforation operation. In one nonlimiting example, the nonlinear shape 24 is periodic such as a sinusoidal shape. In such nonlimiting example, the shape width, W, is the full wavelength, WL, of the periodic shape when that shape 24 is provided at angle on the base 30 or support 32 as shown, for example, in FIGS. 3 and 7A. The wavelength, WL, is the distance measured between adjacent crests or adjacent troughs. The shape width, W, in such nonlimiting example is not half of the wavelength, WL, because the angle of interactions between the blade 20 and the counter component 22 will vary despite the mirror image and uniformity of the shape. A shaped cross section (discussed above) will also cause the angles of interaction to vary along the shape width, W, especially where one of the components 18 is rotating. FIGS. 8-8B illustrate different types of interactions that may be made depending on where a tooth 26 strikes on the shape 24 (e.g., an ascending side, a descending side, a crest, a trough, etc.). For example, where the shape 24 is periodic and skewed as in FIG. 8, a tooth 26*a* striking at the top 240 of the wave is almost parallel to the shaped component 18*a* at the point of interaction A, whereas the tooth 26*b* striking (or otherwise interacting with) the steepest point, 242, along the wave, is almost perpendicular to the shaped component 18*a* at the point of interaction B. In such nonlimiting example, the interaction area (e.g., surface contact area) is less at the steepest point 242 along the wave and thus the stress is significantly lower than at the top 240 of the wave where a greater amount of surface area is involved in the interaction between the two components 18.

The shape width, W, and the resulting shifting distance, D, (discussed below) will vary based on the uniformity or nonuniformity of the shape 24 such as variations in amplitude or wavelength, WL, the angle at which the shape 24 is positioned with respect to the toothed component 18*a*, rotational speed(s) (if any), dimensions of the equipment 18, 30, 32, variations in the size and/or shape of the teeth 26 and like considerations.

The blade 20 and/or the counter component may comprise teeth 26. In other words, the toothed component 18*b* may comprise the blade 20, or the toothed component 18*b* may comprise the counter component 22. In one nonlimiting example, the blade 20 comprises teeth 26 and the counter component 22 comprises the nonlinear shape 24. In another nonlimiting example, the counter component 22 comprises teeth 26 and the blade 20 comprises the nonlinear shape 24. In yet another nonlimiting example, both the blade 20 and the counter component 22 comprise teeth 26, which may be the same or different (e.g., same or different dimensions or spacing) and at least one of the blade 20 and the counter component 22 further comprises a nonlinear shape 24. In still a further nonlimiting example, both the blade 20 and the counter component 22 comprise nonlinear shapes 24, which may be the same or different (e.g., same or different design, length, etc.), and at least one of the components 18 further comprises a plurality of teeth 26.

The shaped component 18*a* may be in operative engagement or be operatively engageable with the toothed component 18*b*. Said differently, the blade 20 and/or the base 30 may be operatively engaged or engageable with the counter component 22 and/or the support 32. Operative engagement means the equipment 20, 22, 30, 32 is arranged such that the blade 20 can interact with the counter component 22 in a manner sufficient to make one or more perforations 14 in a web 16 that passes between the components 18. In one nonlimiting example, the support 32 can be arranged in relationship to a rotatable cylindrical base 30*a* (that comprises a counter component 22) such that the blade 20 can interact with the counter component 22 as the counter component 22 rotates past the blade 20; the interaction sufficient to make one or more perforations 14 in a web 16.

The present inventors have surprisingly found that providing a means 28 to reciprocally shift one of the components 18, such that the shifting covers a distance, D, that corresponds to the shape width, W, of the nonlinear shape 24, greatly minimizes the problem of uneven component 18 wear, especially where a shape 24 is provided at an angle to the toothed component **18*b*. Generally, the shaped component 18*a* interacts with the toothed component 18*b*. The failure to reciprocally shift for the distance, D, causes the shaped component 18*a* to develop grooves where the teeth 26 repeatedly strike. Further, the toothed component 18*b* would experience uneven wear as the individual teeth 26 would perform different levels of work. Shifting for only a short distance, for example a couple of tooth widths, would not permit every tooth 26 to experience equal work because of variation in the angles of interaction involved with nonlinear shapes 24 and components 18 having shaped cross sections. Again, FIGS. 8-8B illustrate different types of interactions that may be made depending on where a tooth 26 strikes on the shape 24** (e.g., an ascending side, a descending side, a crest, a trough, etc.).

In one embodiment, the toothed component **18*b* is reciprocally shifted. In another embodiment, the shaped component 18*a* is reciprocally shifted. In one nonlimiting example, the blade 20 is reciprocally shifted. In another nonlimiting example, the counter component 22 is reciprocally shifted. In a further nonlimiting example, the driving means 28 is associated with the support 32, causing the support 32 to reciprocally shift and therefore causing the blade 20 to reciprocally shift. In another nonlimiting example, the counter component 22 is reciprocally shifted. In a further nonlimiting example, the driving means 28 is associated with the base 30, causing the base 30 to reciprocally shift and therefore also causing the counter component 22** to reciprocally shift.

Figure 9:
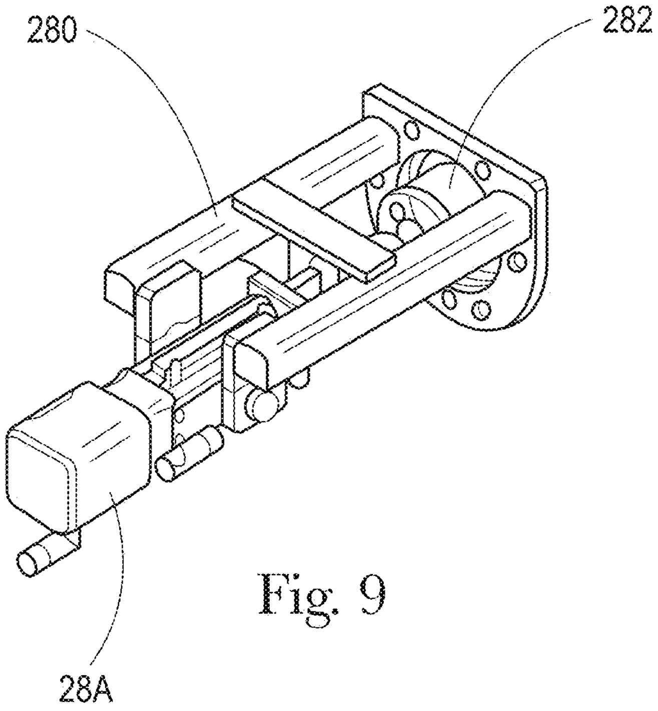
FIG. 9 is a perspective view of a driving means in accordance with an embodiment of the present disclosure.

The driving means 28 may be associated with a component 18 by any suitable means. The driving means 28 may be any means suitable for providing a reciprocal shifting motion to the component 18 with which the driving means 28 is associated. In an embodiment, the driving means 28 is a linear actuator **28*a* as shown in FIG. 9. In one nonlimiting example, the linear actuator 28*a* is attached to the support 32 and/or base 30 with brackets 280 and a coupling assembly 282**.

One or more components 18 may reciprocally shift for a distance, D, which corresponds to the shape width, W. One nonlimiting example of reciprocal shifting movement is oscillation where the shifting motion is a regular, repeatable back and forth movement at a regular rate. In another embodiment, the component 18 may be reciprocally shifted at in an irregular manner (e.g., at varying velocities) in order to more effectively prevent uneven equipment wear. For example, the velocity of the shifting movement may vary at different positions along the shape 24. The manner of reciprocal shifting (e.g., rate variations, acceleration changes, dwell periods) may be determined by considering various factors including but not limited to the shape 24, production conditions such as line speed and the type of web material 16, physical constraints, the structure and placement of teeth 26, angles of interaction between the components 18 as well as the force exerted on the web and resulting web movement. The manner of reciprocal shifting may be controlled by a predetermined movement profile. The movement profile may comprise one of the group of an acceleration profile, a deceleration profile, a velocity profile, a dwell position, a dwell duration, a distance profile, position versus time profile, shift position versus interaction position profile and combinations thereof. In one nonlimiting example, an algorithm is used to create the movement profile to control the reciprocal shifting. In another nonlimiting example, the driving means 28 is programmed to operate in accordance with the movement profile. In yet another nonlimiting example, the driving means 28 is servo-controlled. In still another nonlimiting example, the driving means 28 comprises a servo linear actuator.

The shifting distance, D, is substantially equivalent to distance that one tooth 26 laterally travels to cover the shape width, W. One of skill in the art will recognize that D will vary based on the angle of the nonlinear shape 24 with respect to the toothed component **18*b*. In one nonlimiting example, the toothed component 18*b* is substantially parallel to the longitudinal axis 31, 33 of a cylinder 30*a*, 32*a* upon which the shaped component 18*a* is disposed. Where the nonlinear shape 24 is generally parallel to the toothed component 18*b* as shown in FIG. 7 (where it is assumed that the toothed component 18*b* is parallel to the longitudinal axis 31, 33), the shifting distance, D, will be substantially equal to the actual shape width, W. Where the shape 24 is provided at an angle with respect to the toothed component 18*b* as shown in FIG. 7A, the shifting distance, D, may be less than the actual shape width, W. Essentially, the shifting distance, D, can form one leg of a triangle, the shape width, W, can form the hypotenuse of the triangle, and geometric calculations can be used determine the actual shifting distance, D, given the shape width, W and respective angles. In one nonlimiting example, the shape 24 is disposed in a helix about a cylinder 30*a*, 32*a* at an angle of 4 degrees with respect to the longitudinal axis of the cylinder 31, 33 and the toothed component 18*b* is substantially parallel to the longitudinal axis 31, 33 of the cylinder 30*a*, 32*a*** during the perforating operation. In such nonlimiting example, the shifting distance, D, would be substantially equal to W*cos 4.

In another nonlimiting example, a component 18, base 30 and/or support 32 is reciprocally shifted for less than the above described shifting distance, D. In an embodiment, the component 18, base 30 and/or support 32 is reciprocally shifted for half of the shape width, W. In yet another nonlimiting example, a component 18, base 30 and/or support 32 is reciprocally shifted for a distance greater than the shifting distance, D. In one nonlimiting example, a component 18, base 30 or support 32 is reciprocally shifted for a distance, Y, where Y is an integer multiple D. In this case, the component 18, base 30 or support 32 is reciprocally shifted for a distance corresponding to multiple shape widths, W. In still another nonlimiting example, the shifting distance, D, is about 10 inches or less, or about 5 inches or less, about 3 inches or less, or about 1.4 inches or about 0.1 inch or greater, or about 0.5 inch or greater.

In an embodiment, a component 18 is shifted while interacting with another component 18. In another embodiment, the components 18 are moved out of interacting relationship prior to one or more of the components 18 being shifted. In one nonlimiting example, a shaped component **18*a* is rotated into interacting relationship with a toothed component 18*b*, and then rotated out of interacting relationship with the toothed component 18*b*. In such nonlimiting example, the shaped component 18*a* and/or toothed component 18*b*** may be shifted while out of interacting relationship.

Figure 10:
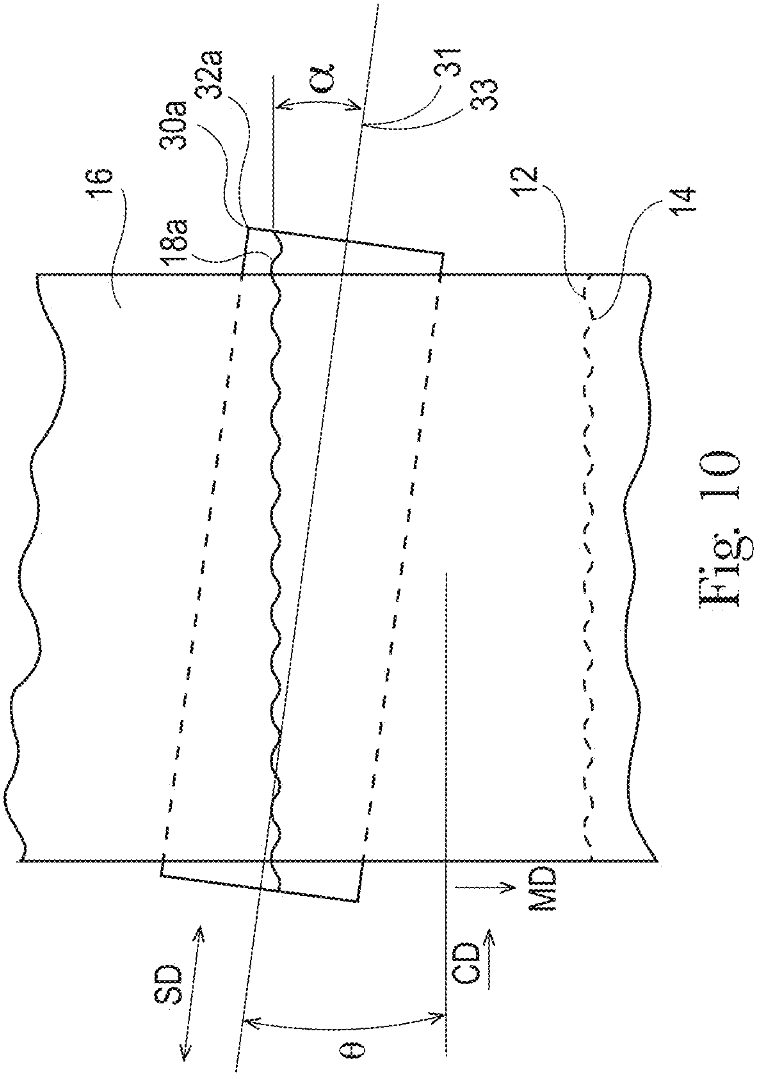
FIG. 10 is a plan view of a web in position to be perforated by a perforating apparatus in accordance with one embodiment of the present disclosure.

In one embodiment, the direction of shifting, SD, is substantially parallel to the longest dimension of the shifting component 18, such as $L_B$ and $L_{CC}$. In another embodiment, the component 18 being reciprocally shifted is disposed on a cylinder 30*a*, 32*a*, and the direction of shifting, SD, is substantially parallel to the longitudinal axis of the cylinder 31, 33. In still a further embodiment, the direction of shifting, SD, is substantially perpendicular to the machine direction, MD as shown in FIG. 1. Turning to FIG. 10, another embodiment is shown wherein the shifting direction, SD, is at an angle θ with respect to the CD of the web 16. In such nonlimiting example, one or more components 18 may also be at angle θ with respect to the CD of the web 16 such that the component 18 is skewed with respect to web 16.

Figure 11:
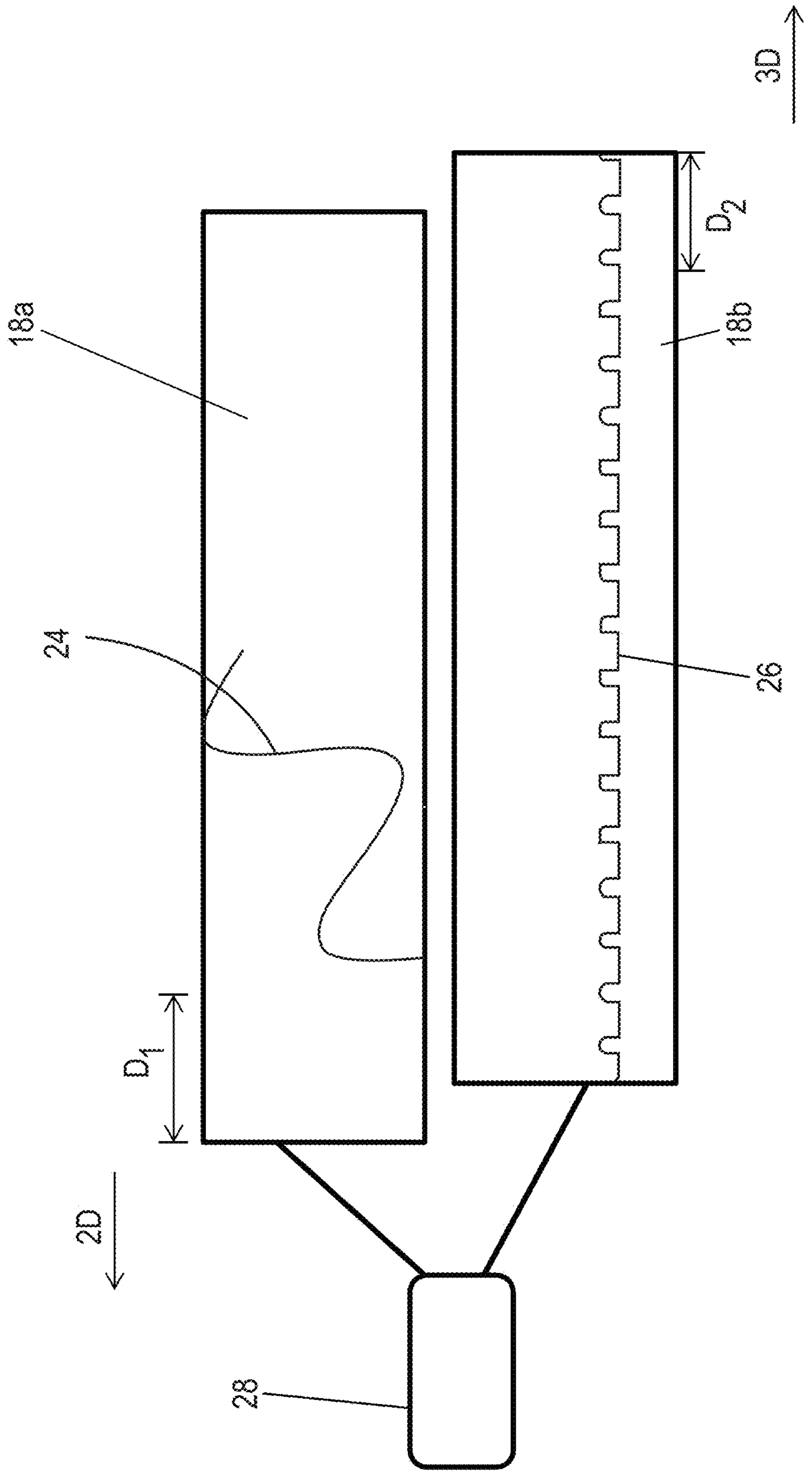
FIG. 11 is a schematic representation of a perforating apparatus in accordance with one embodiment of the present disclosure.

In yet another embodiment shown in FIG. 11, a driving means 28 is associated with both the shaped component 18*a* and the toothed component 18*b*. The shaped component 18*a* may be reciprocally shifted for a distance, D1, beginning in a second direction, 2D. The toothed component 18*b* may be reciprocally shifted for a distance, D2, beginning in a third direction, 3D. The second direction, 2D, may be opposite to the third direction, 3D. The sum of D1 and D2 may be substantially equal to at least the translational distance that one tooth travels to cover the shape width, W. In other words, the sum of D1 and D2 may be substantially equivalent to the shifting distance, D. In one nonlimiting example, the driving means 28 is associated with both the blade 20 and the counter component 22 (or any configuration that will cause both the blade 20 and the counter component 22 to reciprocally shift) and the sum of the distance traveled by the blade and the distance traveled by the counter component is substantially equivalent the shifting distance, D (i.e., the translational distance that one tooth 26 travels to cover with the entire the shape width, W). The shifting of the shaped component 18*a* may occur before, after or at least partially simultaneously with the shifting of the toothed component 18*b*.

A web material 16 may be passed between the blade 20 and the counter component 22 such that the web 16 is perforated when the blade 20 and counter component 22 are in interacting relationship. The blade 20 may comprise teeth 26 and thus be the toothed component 18*b*, and the counter component 22 may comprise a nonlinear shape 24 and thus be the shaped component 18*a*. In another nonlimiting example, the counter component 22 is the toothed component 18*b* and the blade 20 is the shaped component 18*a*. In one embodiment, the web 16 is perforated as the web 16 passes between the base 30 and the support 32 and the blade 20 cooperates with the counter component 22. The web material 16 may comprise a fibrous structure, such as a sanitary tissue product. The web material travels in a machine direction, MD. In one nonlimiting example, the shifting direction, SD, is substantially perpendicular to the machine direction, MD. In another nonlimiting example, the shifting direction, SD, is at an angle θ with respect to the CD of the web 16. In such nonlimiting example, one or more components 18 may also be at angle θ with respect to the CD of the web 16 such that component 18 is skewed with respect to web 16.

Figure 12:
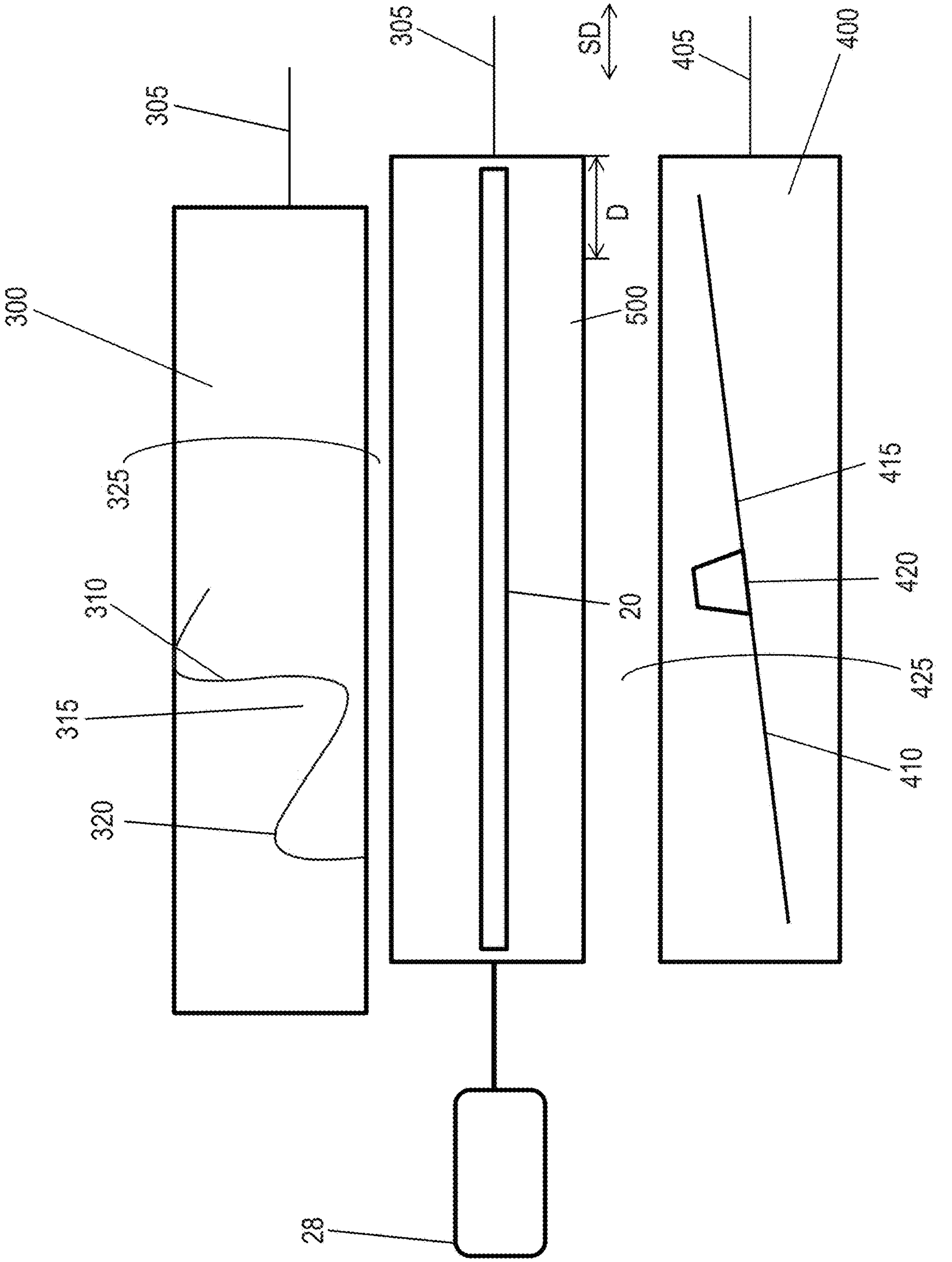
FIG. 12 is a schematic representation of a perforating apparatus in accordance with another embodiment of the present disclosure.
Figure 12A:
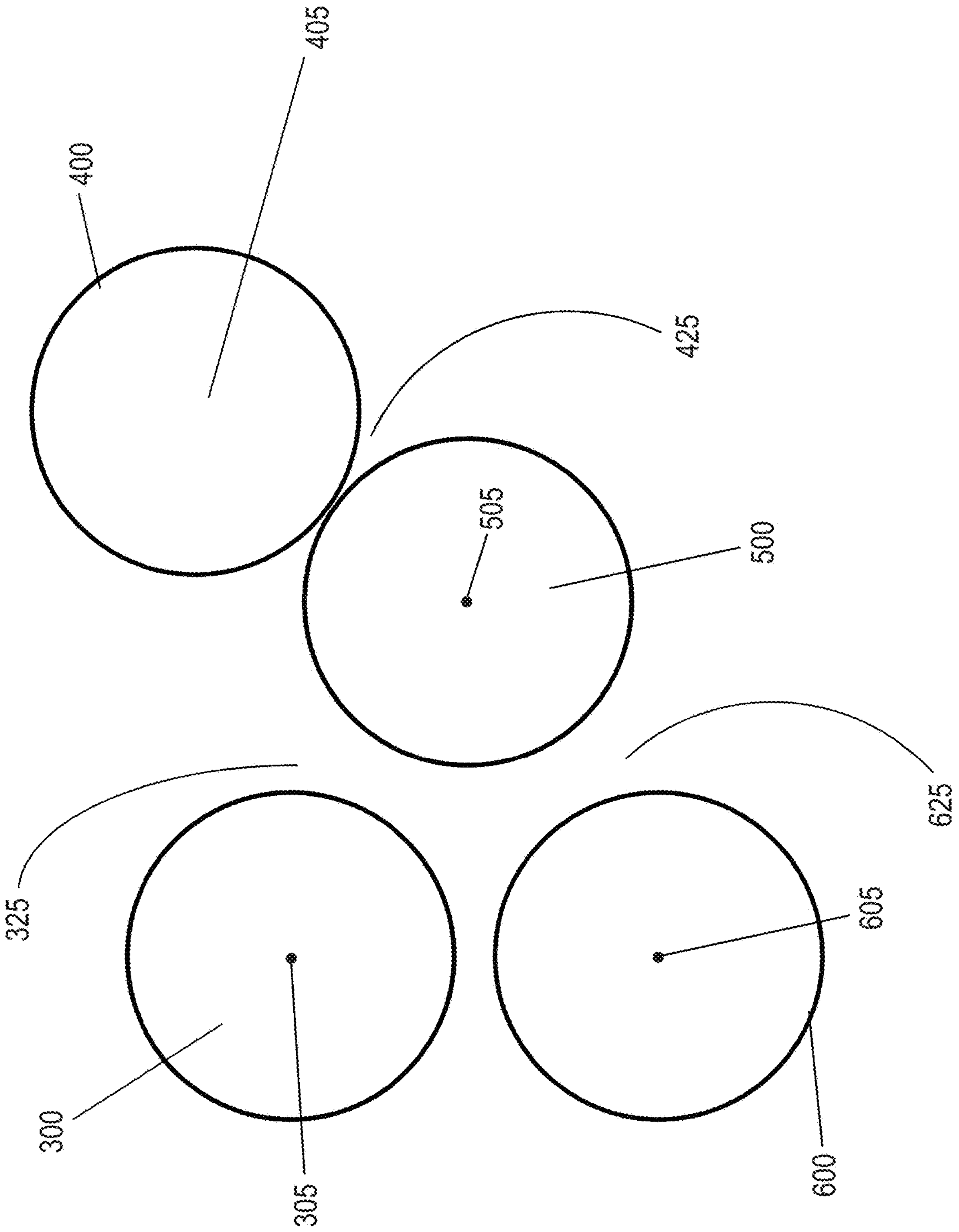
FIG. 12A is a schematic representation showing various perforating paths in accordance with an embodiment of the present disclosure.

Turning to FIGS. 12 and 12A, the apparatus 10 may provide multiple alternative paths 325, 425, 625 for the web material 16. The apparatus 10 may comprise a plurality of rolls 300, 400, 600 that are operatively engageable with a support 500. In one embodiment, the apparatus 10 comprises a first roll 300, a second roll 400 and a support 500 that is operatively engageable with the first roll 300 and the second roll 400. The rolls 300, 400 and the support 500 may be arranged in any way that permits operative engagement (e.g., side to side as shown in FIG. 12, vertical alignment (not shown), triangular positioning wherein, for example, the support 500 sits a different vertical height than the rolls, etc.). The first roll 300 comprises a first longitudinal axis 305 about which the roll 300 rotates. The second roll 400 comprises a second longitudinal axis 405 about which it 400 rotates. The first longitudinal axis 305 can be substantially parallel to the second longitudinal axis 405. In another nonlimiting example, the first longitudinal axis 305 is not substantially parallel to the second longitudinal axis 405. The support 500 may be moveable with respect to the first roll 300 and/or the second roll 400. Likewise, the first roll 300 and/or second roll 400 may be moveable with respect to the support 500. In one nonlimiting example, the support 500 comprises a cylindrical support 500*a* having a support longitudinal axis 505. The cylindrical support 500*a* may or may not rotate about the axis 505.

Figure 13A:
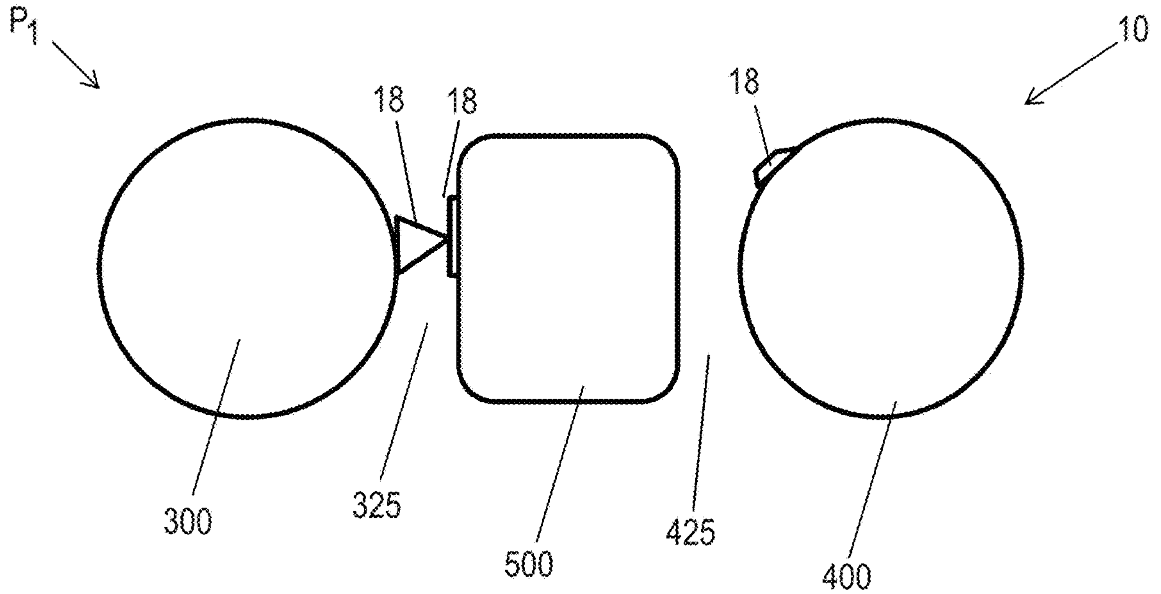
FIG. 13A is a side elevation view of a perforating apparatus in accordance with an embodiment of the present disclosure.
Figure 13B:
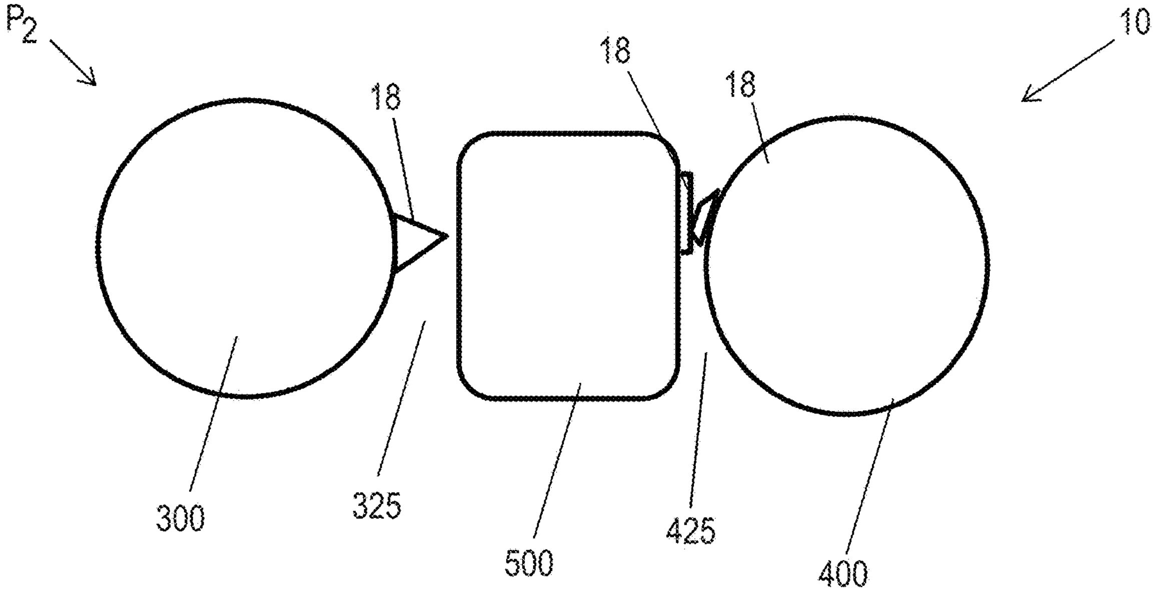
FIG. 13B is a side elevation view of a perforating apparatus in accordance with another embodiment of the present disclosure.

A first path 325 is defined between the first roll 300 and the support 500, such that when a web 16 is perforated as it 16 passes between the first roll 300 and the support 500 and the components 18 on the first roll 300 and the support 500 cooperate in interacting relationship. A second path 425 is defined between the support 500 and the second roll 400, such that when a web 16 is perforated as it 16 passes between the second roll 400 and the support 500 and the components 18 on the second roll 400 and the support 500 cooperate in interacting relationship. The support 500 may be capable of adopting a first position, P1, wherein the support 500 is brought into engaging relationship with the first roll 300 (FIG. 13A) and a second position, P2, wherein the support 500 is brought into engaging relationship with the second roll 400 (FIG. 13B). A driving means 28 may be associated with the first roll 300, the second roll 400 and/or the support 500 to reciprocally shift at least one of the first roll 300, the second roll 400 and the support 500.

In a further embodiment, the first roll 300 comprises a first anvil 310 having a first design 315. The first design 315 may comprise a first shape 320, which may be nonlinear or partially nonlinear. The second roll 400 may comprise a second anvil 410, which may comprise a second design 415. The second design may comprise a second shape 420, which may be nonlinear or partially nonlinear. The first shape 320 may be the substantially same as or different from the second shape 420. Likewise, the first design 315 and second design 415 may be substantially the same or different. The support 500 may comprise at least one blade 20. In one nonlimiting example, the support 500 comprises a first blade 200 that is disposed on the support 500 so as to cooperate with the first anvil 310. The support 500 may also comprise a second blade 210 disposed on the support 500 in such a way as to cooperate with the second anvil 410. The support 500 may be turned or otherwise repositioned then fixed in a position such that a different blade 20, 200, 210 may be placed in interacting relationship with the first anvil 310 or second anvil 410 or such that the same blade 20, 200, 210 can be placed in interacting relationship with the different anvil 310, 410. The blades 20, 200, 210 may have any of the blade 20 features disclosed herein. The anvils 310, 410 may have any of the counter component 22 features disclosed herein, including for example, the anvils 310, 410 may be positioned at angle with respect to the blade 20 or the roll longitudinal axis 305, 405. Any one or more of the blades 20, 200, 210 or the anvils 310, 410 may comprise a plurality of teeth 26.

Figure 14:
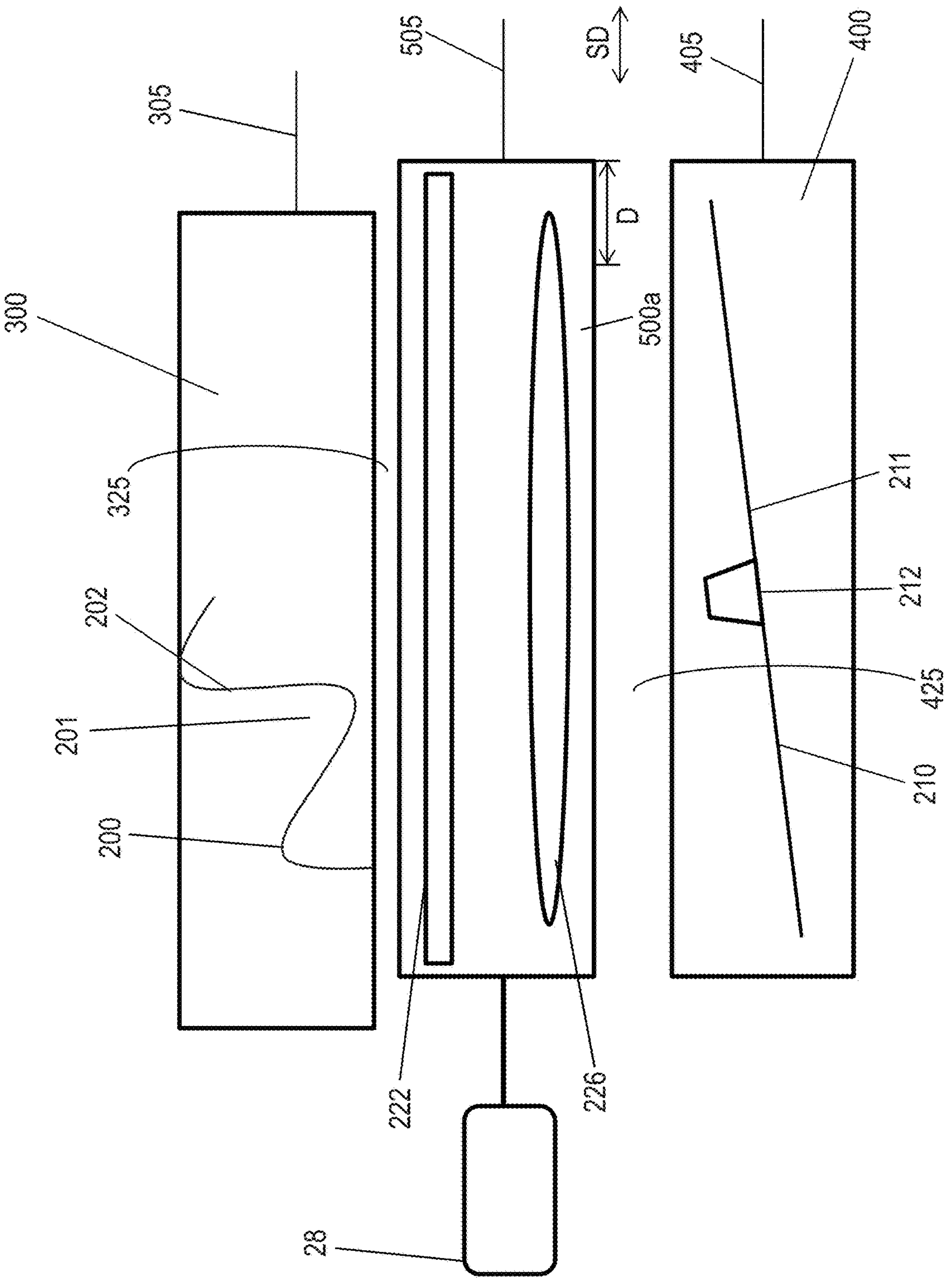
FIG. 14 is a schematic representation of a perforating apparatus in accordance with yet another embodiment of the present disclosure.

In another embodiment shown in FIG. 14, the first roll 300 may comprise a first blade 200 which may comprise a first blade design 201. The first blade design 201 may comprise a nonlinear shape 202. The second roll 400 may comprise a second blade 210 having a second blade design 211. The second blade design 211 may comprise a nonlinear shape 212. The first and second blade designs 201, 211 may be substantially the same or different. Likewise, the nonlinear shapes 202, 212 on the first and second blades 200, 210 may be the same or different. The support 500 may comprise at least one counter component 22. The counter component 22 may comprise an anvil 22*a*. In one nonlimiting example, the support 500 comprises a first counter component 222 disposed on the support 500 so as to cooperate with the first blade 200. The support 500 may further comprise a second counter component 226 disposed on the support 500 so as to cooperate with the second blade 210. The support 500 may be turned or otherwise repositioned and then fixed in a position such that a different counter component 22, 222, 226 may interact with the first blade 200 or the second blade 210 or the same counter component 22, 222, 226 can be placed in interacting relationship with a different blade 200, 210. The blades 200, 210 may have any of the blade 20 features disclosed herein. In an embodiment, the blades 200, 210 may be positioned at angle with respect to the counter components 22 or the roll longitudinal axis 305, 405. The counter components 22, 222, 226 may have any of the counter component 22 features disclosed herein. Any one or more of the blades 200, 210 or the counter components 22, 222, 226 may comprise a plurality of teeth 26.

Figure 15:
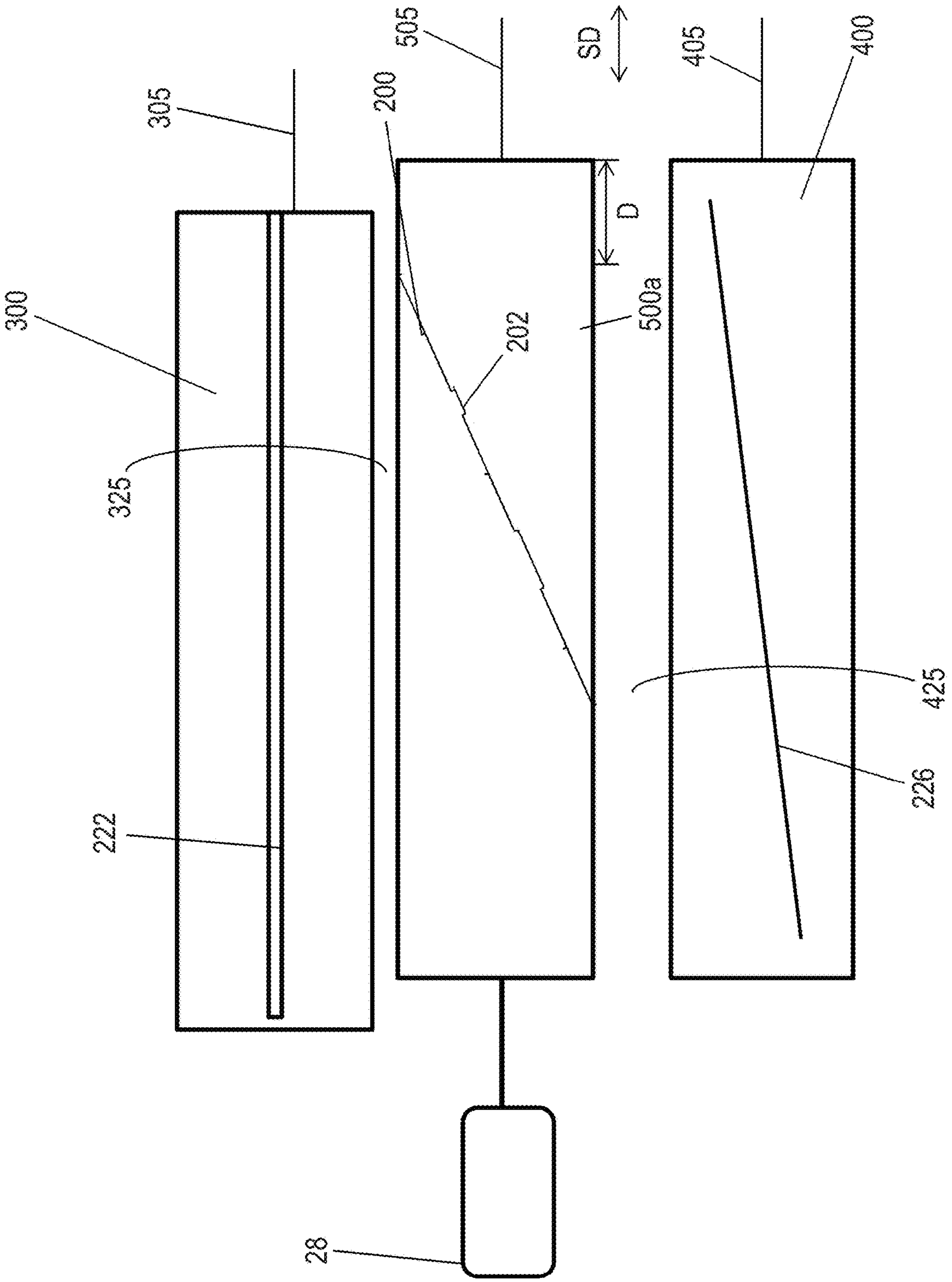
FIG. 15 is a schematic representation of a perforating apparatus in accordance with still another embodiment of the present disclosure.

In yet another embodiment shown in FIG. 15, the first roll 300 may comprise a first counter component 222, and the second roll 400 may comprise a second counter component 226. The support 500 may comprise a first blade 200 having a nonlinear shape 202 and being disposed on the support 500 so as to cooperate in interacting relationship with the first counter component 222 or the second counter component 226 depending on the support 500 position and/or the rolls' 300, 400 positions with respect to the support 500. The support 500 may comprise a cylindrical support 500*a* and a support longitudinal axis 505 about which the support 500 rotates. The first counter component 222 and/or the second counter component 226 may comprise an anvil 22*a*. The first blade 200 may have any of the blade 20 features disclosed herein. In one nonlimiting example, the first blade 200 may be positioned at angle with respect to a counter component 22 or the support longitudinal axis 505. The counter components, 222, 226 may have any of the counter component 22 features disclosed herein. Any one or more of the blades, 200, 210 or the counter components 222, 226 may comprise a plurality of teeth 26.

One of skill in the art will appreciate that the apparatus 10 may comprise more than two rolls 300, 400 operatively engageable with the support 500. In one nonlimiting example, the apparatus 10 comprises a third roll 600 (shown in FIG. 12A) which may comprise one or more blades and/or counter components (not illustrated), where the blades 20 and counter components 22 may comprise any of the respective features disclosed herein. Together with the support 500, the third roll 600 defines a third path 625 for the web 16. In such example, the support 500 may adopt a third position (not shown) wherein the support 500 is brought into engaging relationship with the third roll 600.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for providing a nonlinear line of weakness on a web material, the apparatus comprising:

a base comprising at least one counter component having a length ($L_{CC}$) wherein the counter component comprises a nonlinear shape having-a shape width (W) and a plurality of teeth;

a support operatively engaged with the base;

a blade having a length ($L_B$) and being disposed on the support so as to either contact or to come in close proximity with the counter component;

wherein at least one of the counter component and the blade has a nonlinear shape;

wherein the base comprises a cylindrical base having a base longitudinal axis, wherein the base rotates about the base longitudinal axis, and the base longitudinal axis runs substantially perpendicular to a machine direction; and wherein the counter component is helically mounted on the cylindrical base at an angle of greater than 0 degrees to about 45 degrees to the base longitudinal axis.

2. The apparatus of claim 1, wherein the support is movable with respect to the base.

3. The apparatus of claim 1, wherein the base is movable with respect to the support.

4. The apparatus of claim 1, wherein the counter component is helically mounted on the cylindrical base at an angle of from about 2 degrees to about 20 degrees with respect to the base longitudinal axis.

5. The apparatus of claim 1, wherein the nonlinear shape is periodic and comprises a wavelength, and the shape width (W) is substantially equivalent to the wavelength.

6. The apparatus of claim 1, wherein the base is stationary in a cross machine direction.

7. The apparatus of claim 1, wherein the driving means is associated with the support.

8. The apparatus of claim 1, wherein the counter component comprises an anvil.

9. The apparatus of claim 1, wherein the nonlinear shape is a sinusoidal shape.

10. The apparatus of claim 1, wherein the counter component comprises a nonlinear shape.

11. The apparatus of claim 1, wherein at least one of the counter component and the blade comprises multiple segments.

12. The apparatus of claim 1, wherein the support is reciprocally shifted for at least a tooth length.

13. The apparatus of claim 1, wherein the base is reciprocally shifted for at least a tooth length.

14. The apparatus of claim 1, wherein the base comprises a cylindrical base having a base longitudinal axis, wherein the base rotates about the base longitudinal axis, and the base longitudinal axis runs substantially perpendicular to a machine direction.

15. The apparatus of claim 1, wherein the counter component is helically mounted on the cylindrical base at an angle of greater than 0 degrees to about 45 degrees to the base longitudinal axis.

16. The apparatus of claim 1, wherein the counter component is helically mounted on the cylindrical base at an angle of from about 2 degrees to about 20 degrees with respect to the base longitudinal axis.

17. The apparatus of claim 1, wherein the nonlinear shape is periodic and comprises a wavelength, and the shape width (W) is substantially equivalent to the wavelength.

18. The apparatus of claim 1, wherein the counter component comprises an anvil.

19. An apparatus for providing a nonlinear line of weakness on a web material, the apparatus comprising:

a base comprising at least one counter component having a length ($L_{CC}$) wherein the counter component comprises a nonlinear shape having-a shape width (W);

a support operatively engaged with the base;

a blade having a length ($L_B$) and being disposed on the support so as to either contact or to come in close proximity with the counter component;

wherein at least one of the counter component and the blade has a nonlinear shape;

wherein at least one of the counter component and the blade comprises multiple segments;

wherein at least one of the counter component and the blade comprises teeth;

wherein the base comprises a cylindrical base having a base longitudinal axis, wherein the base rotates about the base longitudinal axis, and the base longitudinal axis runs substantially perpendicular to a machine direction; and wherein the counter component is helically mounted on the cylindrical base at an angle of from about 2 degrees to about 20 degrees with respect to the base longitudinal axis.

20. An apparatus for providing a nonlinear line of weakness on a web material, the apparatus comprising:

a base comprising at least one counter component having a length ($L_{CC}$) wherein the counter component comprises a nonlinear shape having-a shape width (W);

a support operatively engaged with the base;

a blade having a length ($L_B$) and being disposed on the support so as to either contact or to come in close proximity with the counter component;

wherein at least one of the counter component and the blade has a nonlinear shape;

wherein at least one of the counter component and the blade comprises multiple segments;

wherein at least one of the counter component and the blade comprises teeth; and wherein the base comprises a cylindrical base having a base longitudinal axis, wherein the base rotates about the base longitudinal axis, and the base longitudinal axis runs substantially perpendicular to a machine direction.

* * * * *